US012069630B2

(12) United States Patent
Abotabl et al.

(10) Patent No.: US 12,069,630 B2
(45) Date of Patent: Aug. 20, 2024

(54) MANAGEMENT OF UPLINK SIGNAL TRANSMISSION REPETITIONS IN A USER EQUIPMENT (UE) CONFIGURED WITH ONE OR MORE PORTIONS OF A FREQUENCY BAND

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/453,631

(22) Filed: Nov. 4, 2021

(65) Prior Publication Data

US 2023/0135803 A1 May 4, 2023

(51) Int. Cl.
H04W 72/0453 (2023.01)
(52) U.S. Cl.
CPC .............. H04W 72/0453 (2013.01)
(58) Field of Classification Search
CPC ................................. H04W 72/0453
See application file for complete search history.

(56) References Cited

U.S. PATENT DOCUMENTS

| 2021/0014008 | A1 | 1/2021 | Takeda et al. |
| 2021/0058111 | A1 | 2/2021 | Liu et al. |
| 2021/0360616 | A1* | 11/2021 | Yi ................ H04L 5/0012 |
| 2022/0116967 | A1* | 4/2022 | Yeo ............ H04W 72/1268 |
| 2022/0240312 | A1* | 7/2022 | Xu ............. H04L 5/0037 |
| 2023/0015168 | A1* | 1/2023 | Ye ............. H04L 1/0009 |
| 2023/0076137 | A1* | 3/2023 | Cozzo ......... H04L 5/0092 |

FOREIGN PATENT DOCUMENTS

WO WO-2021055167 A1 * 3/2021 ........ H04W 72/0446

OTHER PUBLICATIONS

International Search Report and Written Opinion—PCT/US2022/048265—ISA/EPO—Feb. 16, 2023.

* cited by examiner

Primary Examiner — Yu-Wen Chang
(74) Attorney, Agent, or Firm — Loza & Loza, LLP

(57) ABSTRACT

The aspects described herein may enable an apparatus (e.g., a UE) allocated with a portion of a frequency band (e.g., a flexible bandwidth part) to transmit a number of repetitions of an uplink signal transmission when the amount of uplink resources in the portion of the frequency band are insufficient. The apparatus receives a resource allocation that allocates at least one portion of a frequency band to the apparatus, wherein a first slot format is associated with the frequency band and a second slot format is associated with the at least one portion of the frequency band. The apparatus transmits repetitions of an uplink signal transmission in the at least one portion of the frequency band based on the first slot format when the repetitions of the uplink signal transmission cannot be transmitted in the at least one portion of the frequency band based on the second slot format.

16 Claims, 19 Drawing Sheets

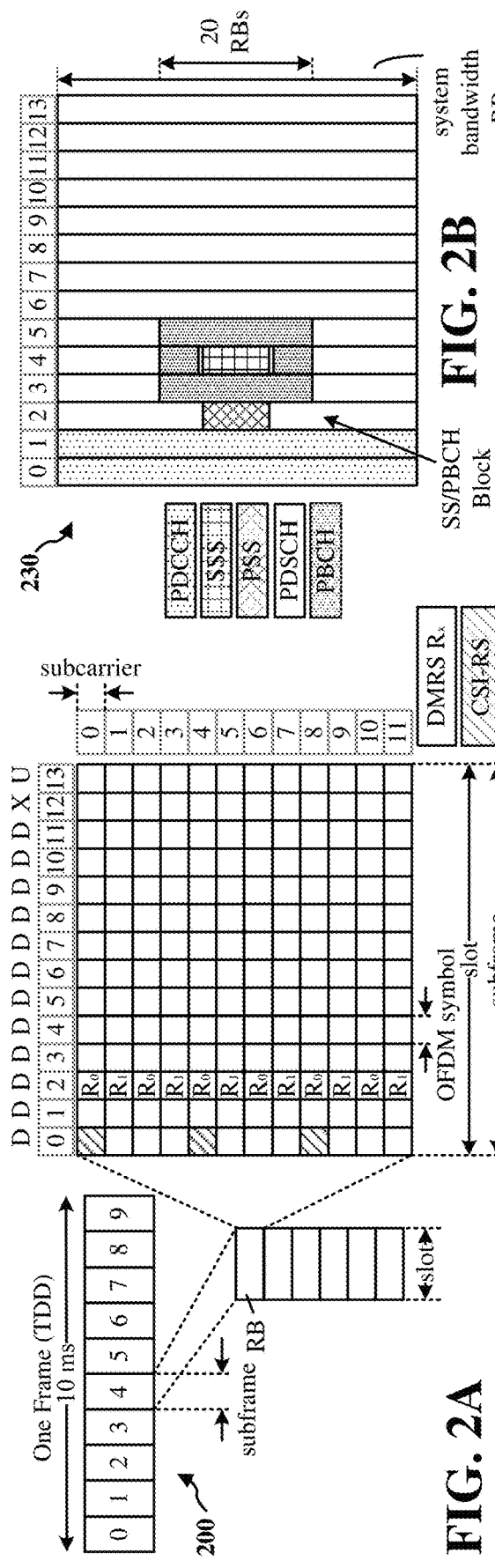
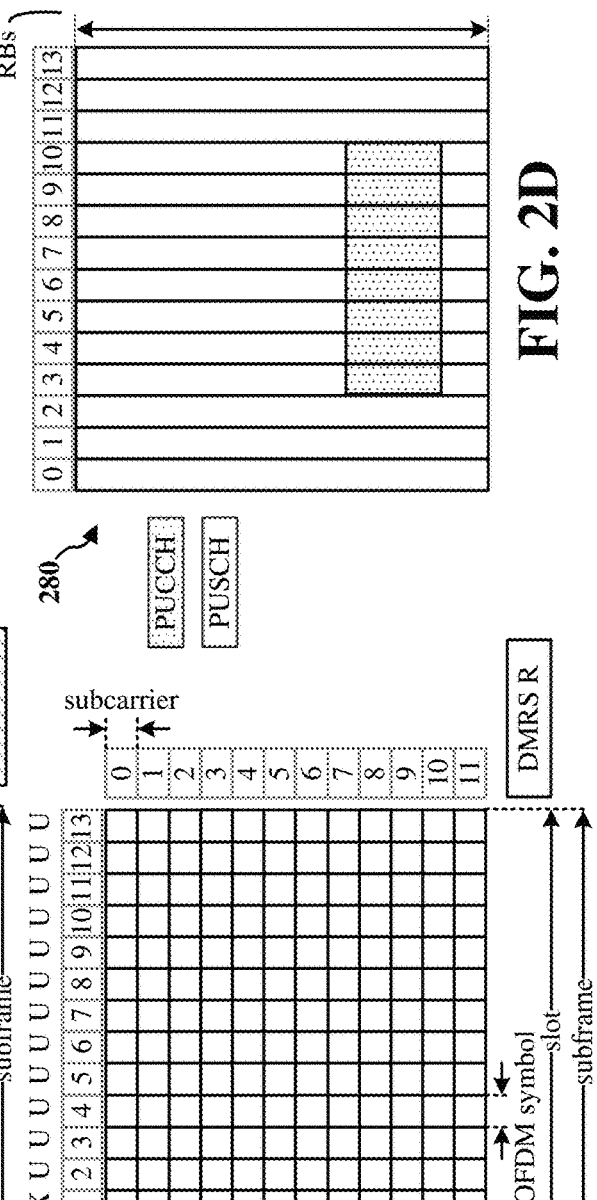
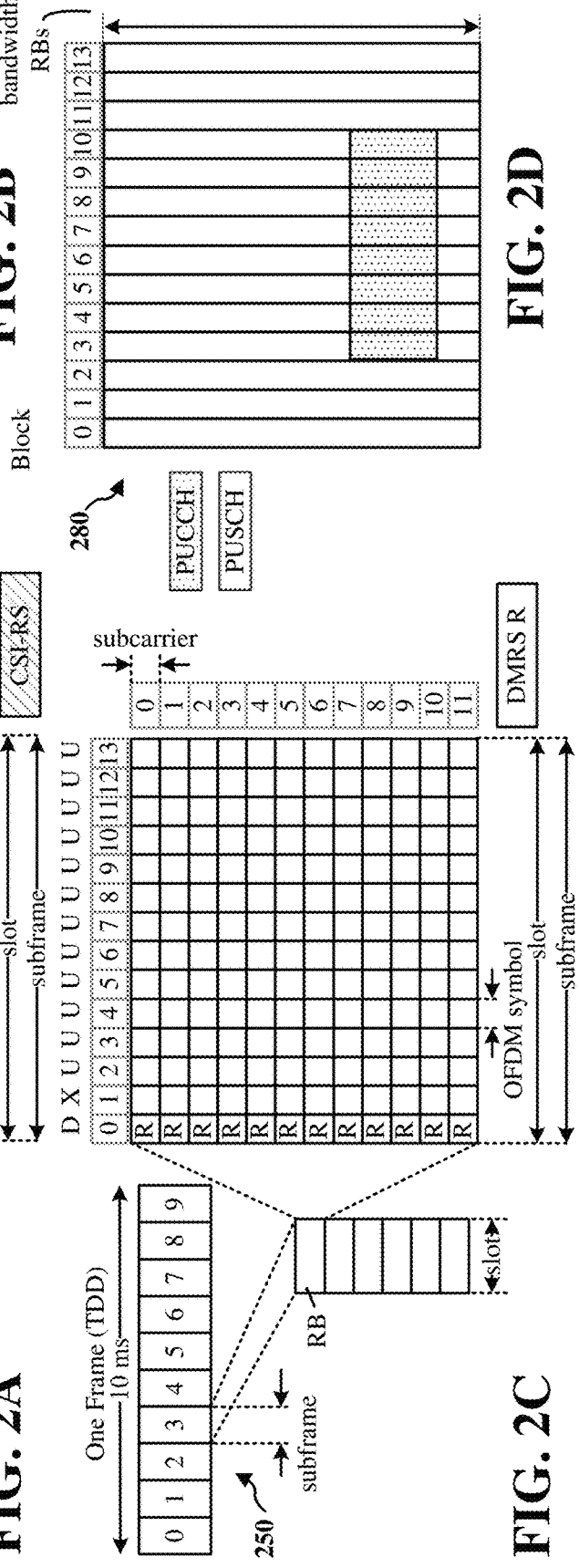
FIG. 2A
FIG. 2B
FIG. 2C
FIG. 2D

```
1300

┌─────────────────────────────────────────────────────────────┐ 1302
│ Receive a resource allocation in a frequency band, the      │
│ resource allocation including at least one portion of the   │
│ frequency band, wherein a first slot format is associated   │
│ with the frequency band and a second slot format is         │
│ associated with the at least one portion of the frequency   │
│ band                                                        │
└─────────────────────────────────────────────────────────────┘
                              │
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ 1304
  Receive a control message identifying frequency resources
│ of the at least one portion of the frequency band to be    │
  used for repetitions of an uplink signal transmission
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
                              ▼
┌─────────────────────────────────────────────────────────────┐ 1306
│ Transmit a number of repetitions of an uplink signal        │
│ transmission in the at least one portion of the frequency   │
│ band based on the first slot format when the number of      │
│ repetitions of the uplink signal transmission cannot be     │
│ transmitted in the at least one portion of the frequency    │
│ band based on the second slot format                        │
└─────────────────────────────────────────────────────────────┘
                              │
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ 1308
  Apply the first slot format to the at least one portion of
│ the frequency band after the number of repetitions of the  │
  uplink signal transmission are transmitted
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ 1310
  Apply the second slot format to the at least one portion of
│ the frequency band after the number of repetitions of the  │
  uplink signal transmission are transmitted
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 13

MANAGEMENT OF UPLINK SIGNAL TRANSMISSION REPETITIONS IN A USER EQUIPMENT (UE) CONFIGURED WITH ONE OR MORE PORTIONS OF A FREQUENCY BAND

BACKGROUND

Technical Field

The present disclosure relates generally to communication systems, and more particularly, to management of uplink signal transmission repetitions in a user equipment (UE) configured with one or more portions of a frequency band.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The aspects described herein may enable an apparatus (e.g., a UE) allocated with a portion of a frequency band (e.g., a flexible bandwidth part) to transmit a number of repetitions of an uplink signal transmission when an amount of uplink resources in the portion of the frequency band are insufficient. For example, the portion of the frequency band may be a flexible bandwidth part and a slot format may be associated with the flexible bandwidth part. The slot format may designate uplink slots and/or downlink slots for the flexible bandwidth part.

In some scenarios, the apparatus may determine to transmit a number of repetitions of an uplink signal transmission in the flexible bandwidth part, but the slot format associated with the flexible bandwidth part may not include a sufficient number of uplink slots to enable the apparatus to transmit the number of repetitions of the uplink signal transmission. In these scenarios, the apparatus may apply the aspects described herein to transmit the number of repetitions of the uplink signal transmission.

In an aspect of the disclosure, a method, a computer-readable medium, and an apparatus are provided. The apparatus receives a resource allocation in a frequency band, the resource allocation including at least one portion of the frequency band, wherein a first slot format is associated with the frequency band and a second slot format is associated with the at least one portion of the frequency band. The apparatus transmits a number of repetitions of an uplink signal transmission in the at least one portion of the frequency band based on the first slot format when the number of repetitions of the uplink signal transmission cannot be transmitted in the at least one portion of the frequency band based on the second slot format.

In an aspect of the disclosure, a method, a computer-readable medium, and an apparatus are provided. The apparatus receives a resource allocation in a frequency band, the resource allocation including at least one portion of the frequency band, wherein a first slot format is associated with the frequency band and a second slot format is associated with the at least one portion of the frequency band. The apparatus transmits a number of repetitions of an uplink signal transmission in the at least one portion of the frequency band based on a third slot format associated with the at least one portion of the frequency band when the number of repetitions of the uplink signal transmission cannot be transmitted in the at least one portion of the frequency band based on either of the first slot format and the second slot format.

In an aspect of the disclosure, a method, a computer-readable medium, and an apparatus are provided. The apparatus receives a resource allocation in a frequency band, the resource allocation including a plurality of portions of the frequency band, wherein each of plurality of portions of the frequency band is associated with a different slot format. The apparatus transmits a number of repetitions of an uplink signal transmission using at least a first portion and a second portion of the frequency band included in the plurality of portions of the frequency band, wherein a first portion of the number of repetitions of the uplink signal transmission is transmitted in the first portion of the frequency band and a second portion of the number of repetitions of the uplink signal transmission is transmitted in the second portion of the frequency band.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 13 is a flowchart of a method of wireless communication.

DETAILED DESCRIPTION

Figure 1:
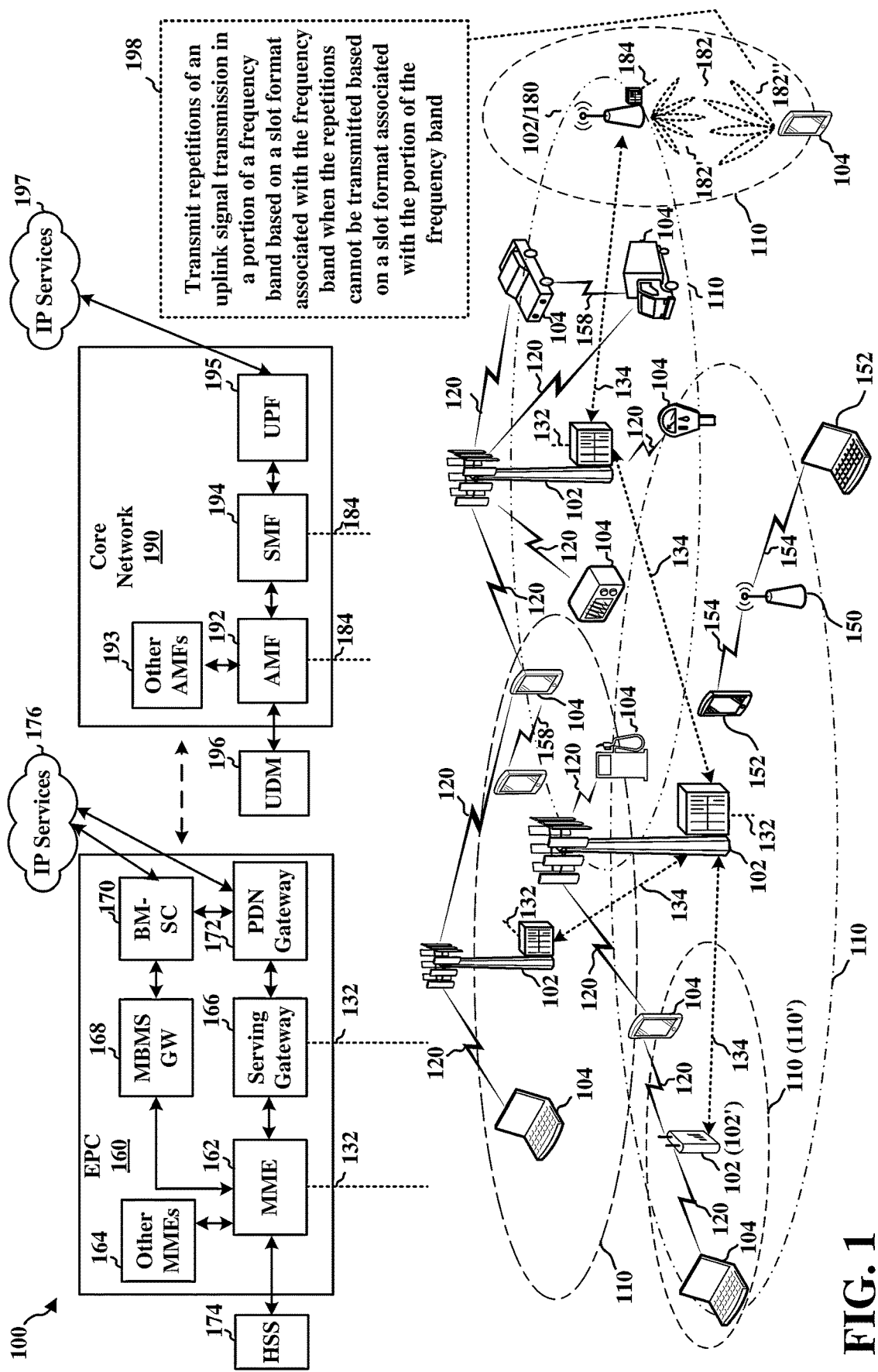
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit repetitions of an uplink signal transmission in a portion of a frequency band based on a slot format associated with the frequency band when the repetitions cannot be transmitted based on a slot format associated with the portion of the frequency band (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
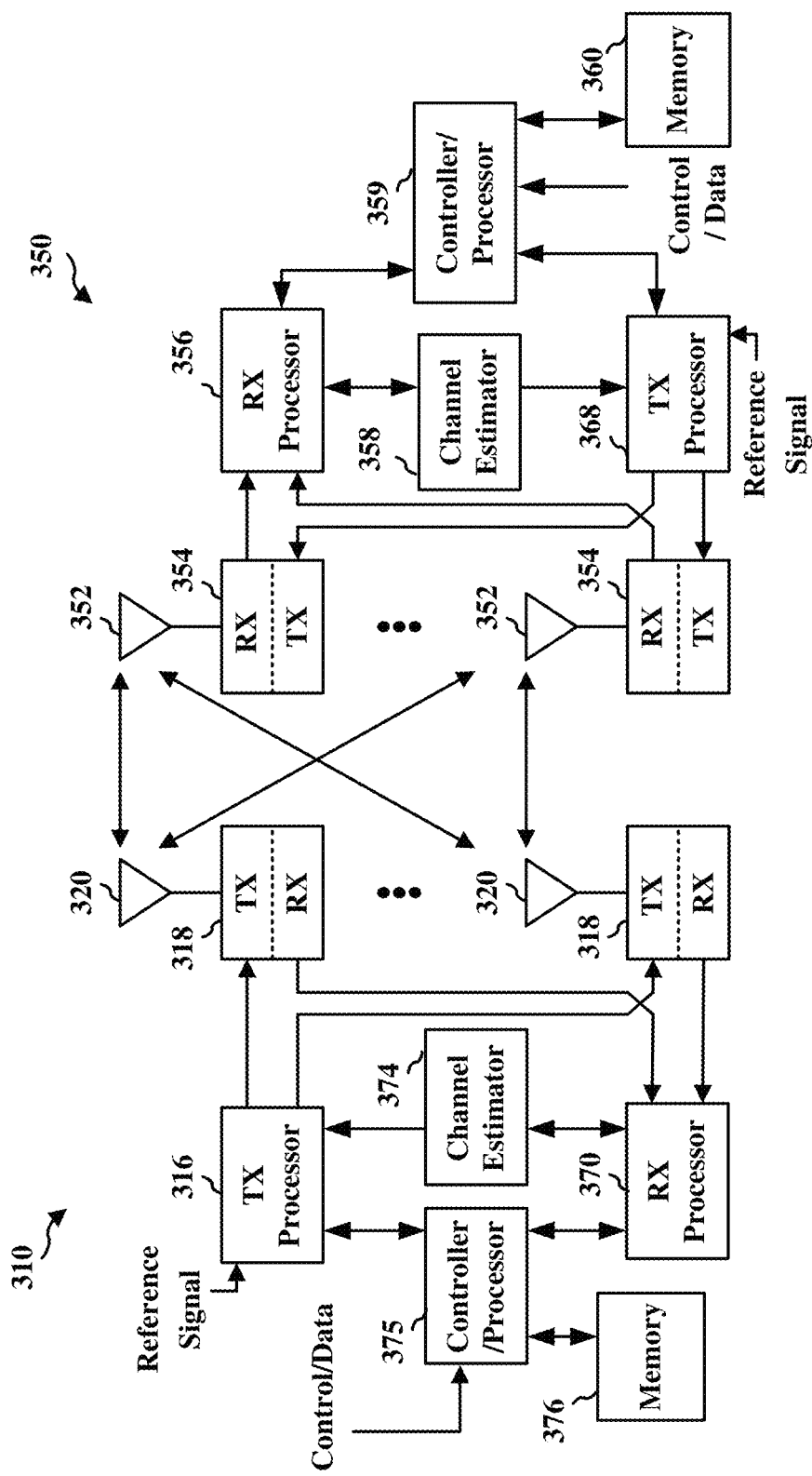
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

As described herein, a base station and a UE may communicate in a wireless communication network, such as a 5G NR network, using one or more carriers (also referred to as radio frequency (RF) carriers). Each carrier may have a certain bandwidth (also referred to as a carrier bandwidth or a cell bandwidth). In one example, a carrier may have a bandwidth of 100 MHz.

A base station and a UE may communicate in a full-duplex mode, which enables a UE to simultaneously transmit and receive over the bandwidth of the carrier. In a first type of full-duplex mode (also referred to as In-Band Full Duplex (IBFD) mode), a UE may simultaneously transmit and receive using the same time-frequency resources. In a second type of full-duplex mode (also referred to as Sub-band frequency division duplex (FDD) mode or flexible duplex mode), a UE may transmit and receive at the same time but on different frequency resources. The time-frequency resources allocated for UL transmissions may fully or partially overlap with time-frequency resources allocated for DL transmissions. Examples of time-frequency resource allocations for the first and second types of full-duplex modes will now be described with reference to FIGS. 4-6.

Figure 4:
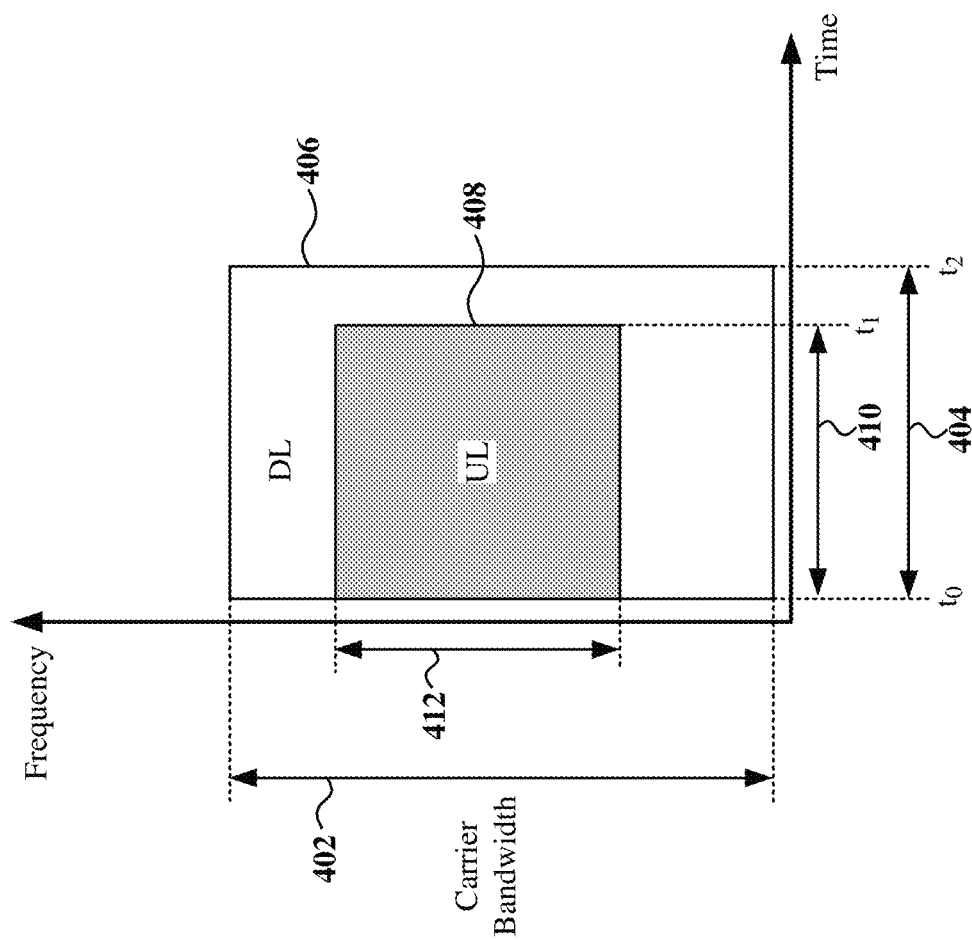
FIG. 4 illustrates a first example allocation of time-frequency resources for the In-Band Full Duplex (IBFD) mode.

FIG. 4 illustrates a first example allocation of time-frequency resources for the IBFD mode. Time resources (e.g., time period 404) and frequency resources (e.g., carrier bandwidth 402) may be allocated for downlink transmissions from a base station and uplink transmissions from a UE to enable full-duplex communication. In FIG. 4, the uplink resource allocation 408 is shown as a shaded region and the downlink resource allocation 406 is shown as an unshaded region. In the example of FIG. 4, it should be noted that the same time resources (e.g., time period 410 from $t_0$ to $t_1$) and the same frequency resources (e.g., frequency band 412) are included in both the downlink resource allocation 406 and the uplink resource allocation 408. Therefore, in the IBFD mode, the same time-frequency resources are shared in the downlink resource allocation 406 and the uplink resource allocation 408.

Figure 5:
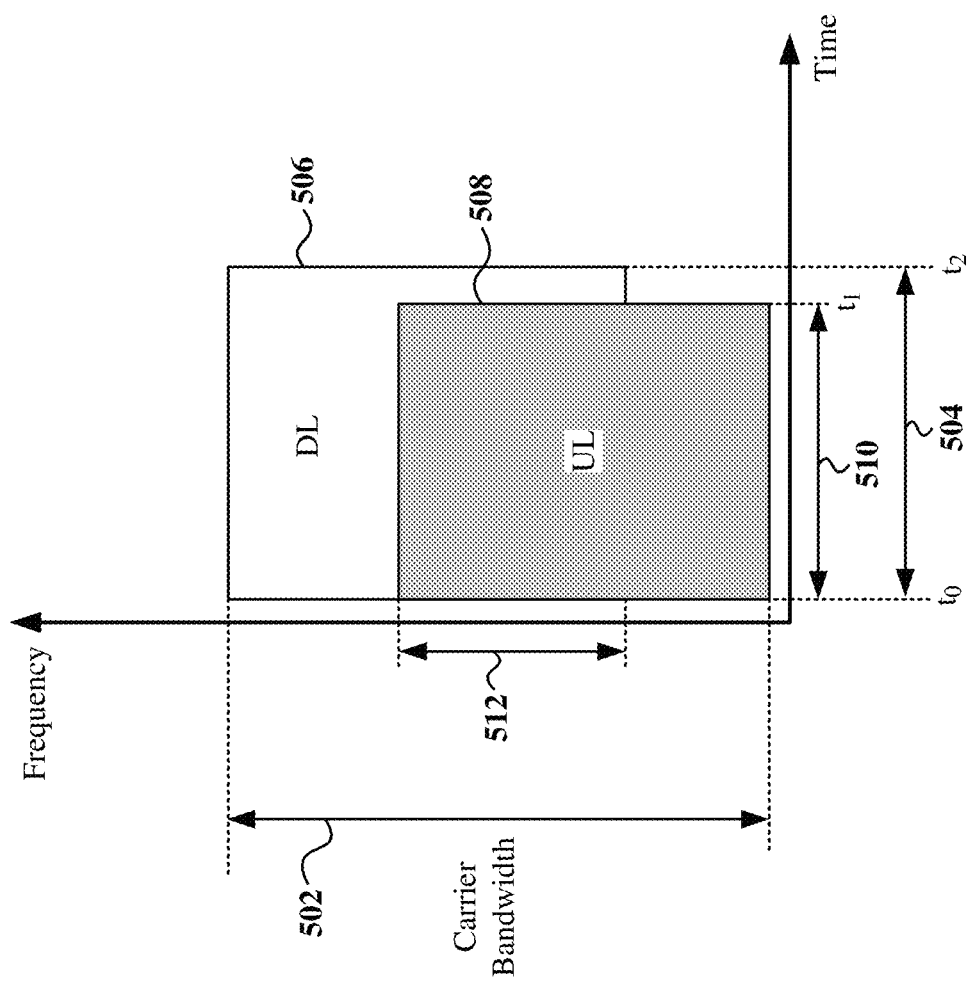
FIG. 5 illustrates a second example allocation of time-frequency resources for the IBFD mode.

FIG. 5 illustrates a second example allocation of time-frequency resources for the IBFD mode. Time resources (e.g., time period 504) and frequency resources (e.g., carrier bandwidth 502) may be allocated for downlink transmissions from a base station and uplink transmissions from a UE to enable full-duplex communication. In FIG. 5, the uplink resource allocation 508 is shown as a shaded region and the downlink resource allocation 506 is shown as an unshaded region. In the example of FIG. 5, it should be noted that the same time resources (e.g., time period 510 from $t_0$ to $t_1$) and the same frequency resources (e.g., frequency band 512) are included in both the downlink resource allocation 506 and the uplink resource allocation 508. Therefore, in the IBFD mode, the same time-frequency resources are shared in the downlink resource allocation 506 and the uplink resource allocation 508.

Figure 6:
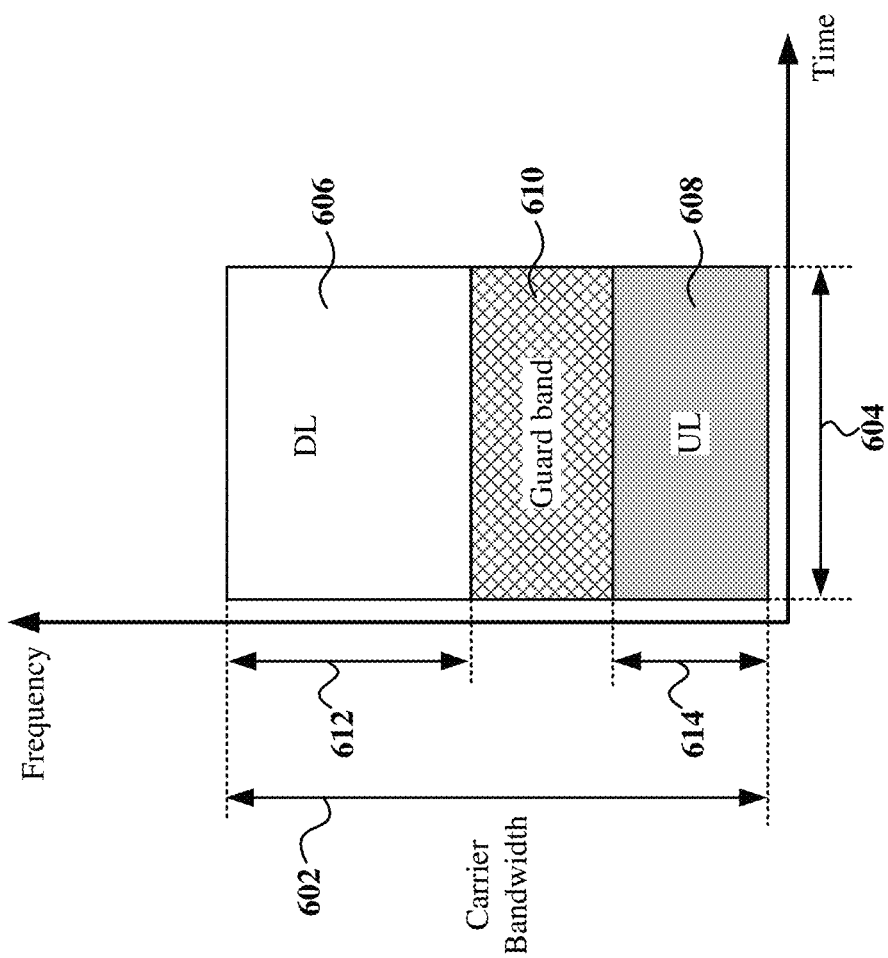
FIG. 6 illustrates an example allocation of time frequency resources for the sub-band frequency division duplex (FDD) mode.

FIG. 6 illustrates an example allocation of time frequency resources for the sub-band FDD mode. Time resources (e.g., time period 604) and frequency resources (e.g., carrier bandwidth 602) may be allocated for downlink transmissions from a base station and uplink transmissions from a UE to enable full-duplex communication. In FIG. 6, the uplink resource allocation 608 is shown as a shaded region and the downlink resource allocation 606 is shown as an unshaded region. In the example of FIG. 6, it should be noted that different frequency resources may be simultaneously used for the downlink transmissions and the uplink transmissions. For example, the downlink resource allocation 606 may include a first frequency band 612 and the uplink resource allocation 608 may include a second frequency band 614. A guard band 610 (shown as a cross-hatched region in FIG. 6) may be used to separate the downlink resource allocation 606 from the uplink resource allocation 608 in the frequency domain.

In some cases, a UE may be allowed to operate (e.g., transmit and/or receive) within a bandwidth that is more narrow than the full bandwidth of a carrier. Accordingly, a UE may be configured with one or more bandwidth parts (BWPs) that are smaller than the full bandwidth of the carrier. In one example, a carrier may have a bandwidth of 100 MHz and a BWP allocated to the UE may have a bandwidth of 20 MHz.

In some examples, a BWP may be configured with a specific TDD pattern of uplink resources and/or downlink resources. A BWP configured with a specific TDD pattern may be referred to as a flexible BWP. For example, a flexible BWP may be associated with a specific slot format that may allow DL and UL transmissions at different times. In some implementations, a flexible BWP may enable full-duplex communication and may provide flexibility with respect to network assignment and concurrent handling of half-duplex UEs, full-duplex aware UEs, and full-duplex UEs.

A UE may repeat an uplink signal transmission multiple times (also referred to as PUSCH repetition) to enable successful reception at a receiver (e.g., a base station). When a UE is configured with a flexible BWP, the ability of a UE to transmit a certain number of repetitions of an uplink signal transmission may depend on the availability of UL resources in the flexible BWP. In some scenarios, if the active BWP of a UE is a flexible BWP that does not include adequate UL resources, the UE may not be able to transmit the number of repetitions of the uplink signal transmission. An example of such scenario is described with reference to FIG. 7.

Figure 7:
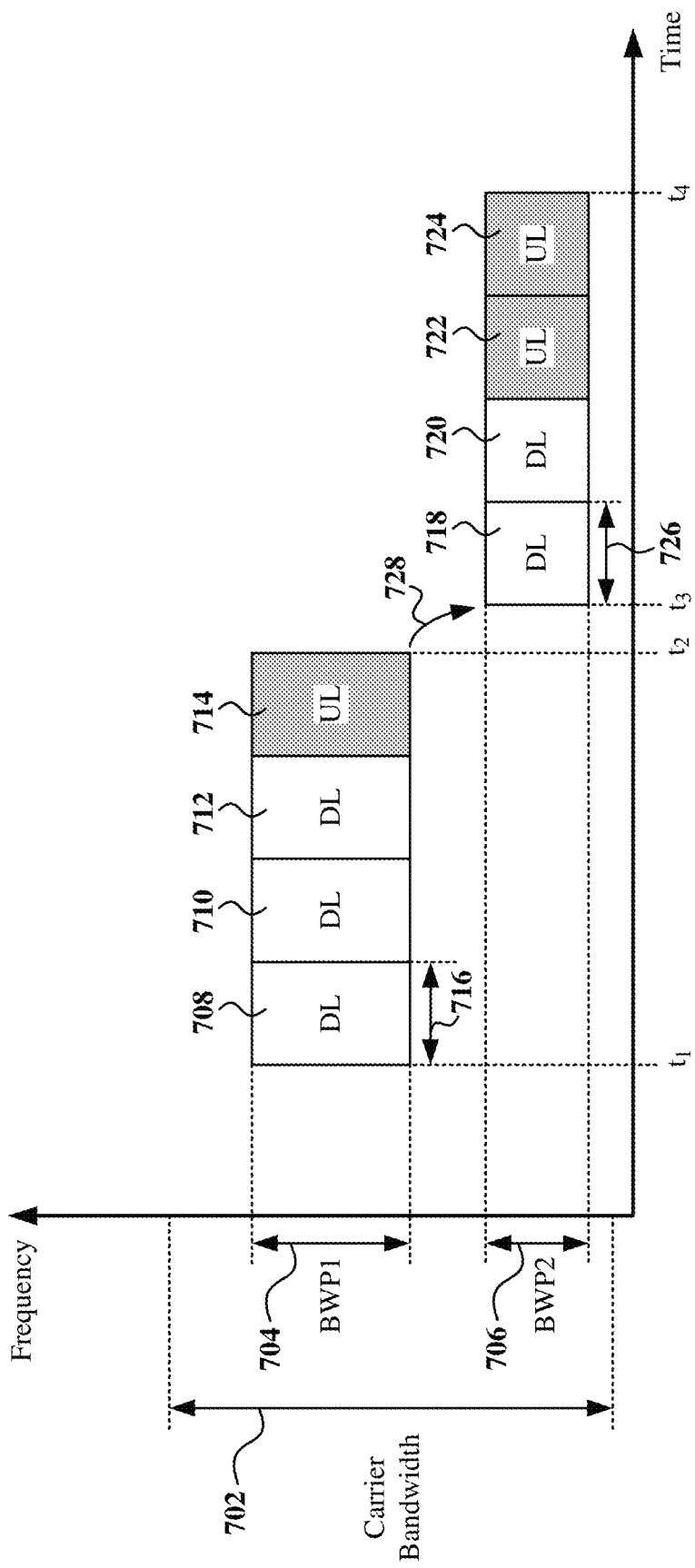
FIG. 7 illustrates an example of multiple flexible bandwidth parts of a carrier bandwidth including a first flexible BWP and a second flexible BWP.

FIG. 7 illustrates an example of multiple flexible BWPs of a carrier bandwidth 702 including a first flexible BWP (BWP1) 704 and a second flexible BWP (BWP2) 706. It should be understood that the multiple flexible BWPs of the carrier bandwidth 702 may or may not be equal in terms of bandwidth. In FIG. 7, for example, the flexible BWP1 704 may include a larger portion of the carrier bandwidth 702 than the flexible BWP2 706.

In one example, the flexible BWP1 704 and the flexible BWP2 706 may each include four slots, such as the slots 708, 710, 712, 714 in the flexible BWP1 704 and the slots 718, 720, 722, 724 in the flexible BWP2 706. Each of the slots 708, 710, 712, 714 in the flexible BWP1 704 may have a first slot duration 716 and each of the slots 718, 720, 722, 724 in the flexible BWP2 706 may have a second slot duration 726. In some examples, the first slot duration 716 may or may not be equal to the second slot duration 726.

In FIG. 7, the example slot format associated with the flexible BWP1 704 includes three consecutive downlink slots (e.g., at slots 708, 710, 712) followed by an uplink slot (e.g., at slot 714). The example slot format associated with the flexible BWP2 706 includes two consecutive downlink slots (e.g., at slots 718, 720) followed by two consecutive uplink slots (e.g., at slots 722, 724).

More than one flexible BWP can be active at a time for a UE. In some examples, a UE may switch between flexible BWPs. For example, with reference to FIG. 7, a UE at time $t_2$ may switch 728 from the flexible BWP1 704 to the flexible BWP2 706. In some examples, a UE may switch between legacy BWPs (e.g., non-flexible BWPs).

A UE may apply all or a portion of a slot format associated with a flexible BWP or may ignore the slot format associated with a flexible BWP. In some of the aspects described herein, a UE may switch between flexible BWPs having different slot formats, may fall back to an underlying slot format, and/or may operate between multiple flexible BWPs to enable higher efficiency for repetitions of uplink signal transmissions (e.g., PUSCH repetitions). The aspects described herein define techniques for handling repetitions of uplink signal transmissions at a UE configured with one or more flexible BWPs.

Figure 8:
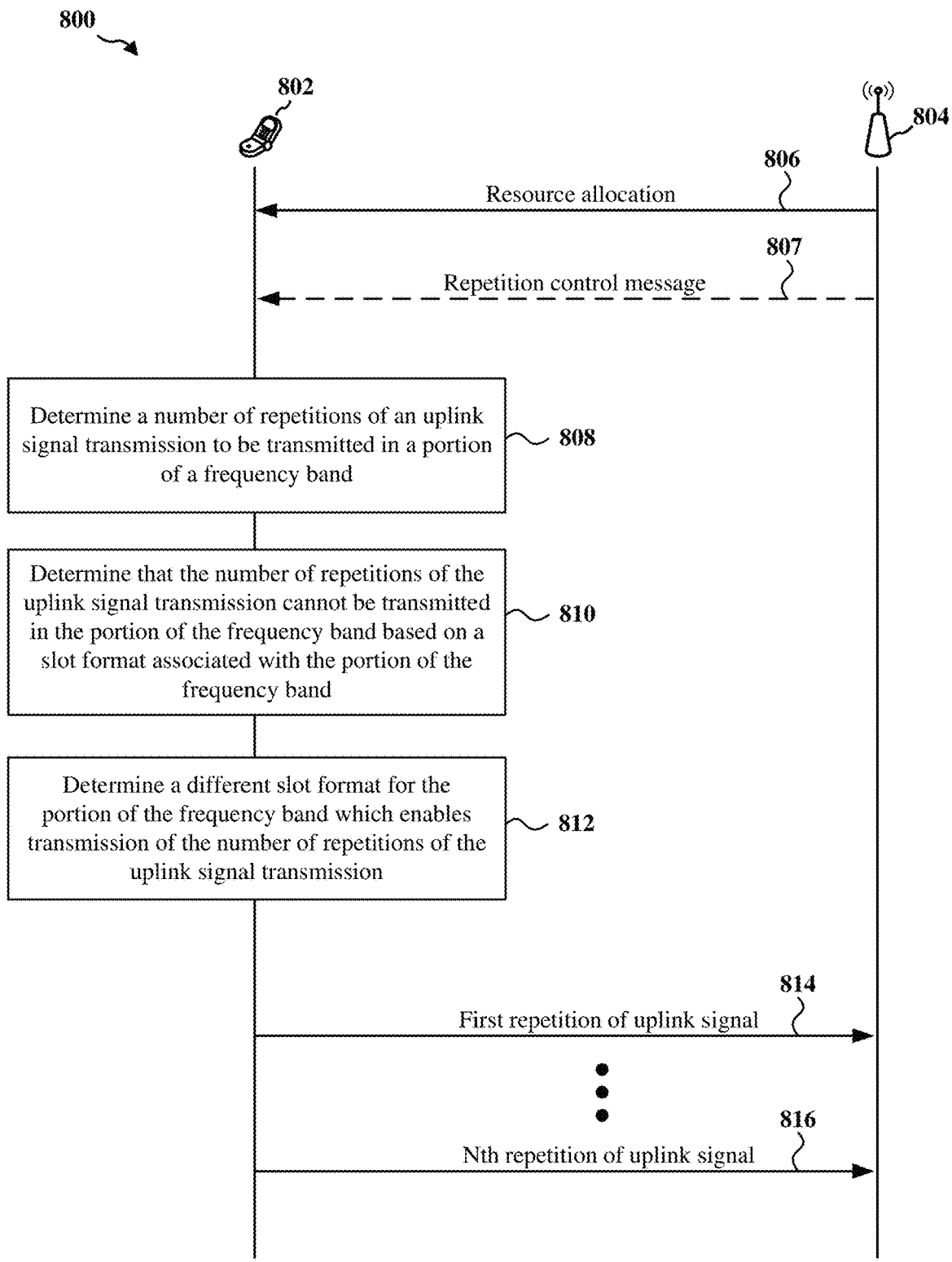
FIG. 8 illustrates a signal flow diagram in accordance with various aspects of the disclosure.

FIG. 8 illustrates a signal flow diagram 800 in accordance with various aspects of the disclosure. The signal flow diagram 800 includes a UE 802 and a base station 804. As shown in FIG. 8, the UE 802 receives a resource allocation 806 from the base station 804. The resource allocation 806 may include one or more portions of a frequency band, such as one or more flexible BWPs. In some examples, the frequency band may be a bandwidth of a carrier. In some examples, each of the one or more portions of the frequency band may be associated with a different slot format. In some examples, the frequency band may be associated with its own slot format (also referred to as an underlying slot format of the frequency band).

In some aspects of the disclosure, the UE 802 may optionally receive a repetition control message 807 from the base station 804. In some examples, the repetition control message 807 may identify frequency resources (e.g., a certain flexible BWP) of the at least one portion of the frequency band that the UE 802 should use for transmitting repetitions of an uplink signal transmission. In some examples, the repetition control message 807 may identify frequency resources (e.g., a certain flexible BWP) of the at least one portion of the frequency band the UE 802 should use for transmitting repetitions of an uplink signal transmission and a slot format (e.g., a TDD pattern) that the UE 802 should apply to the frequency resources.

At 808, the UE 802 determines a number of repetitions of an uplink signal transmission to be transmitted in a portion of the frequency band (e.g., a flexible BWP) allocated to the UE 802. In the examples described herein, the number of repetitions may be expressed as a value of N, where N represents a positive integer greater than or equal to two. The number of repetitions (e.g., N) may include an initial transmission of an uplink signal transmission from the UE 802 (also referred to as a first repetition of the uplink signal transmission) and subsequent transmissions of that same uplink signal transmission from the UE 802. In one example, the UE 802 may determine that three repetitions of an uplink signal transmission (e.g., N=3) are to be transmitted in the portion of the frequency band.

At 810, the UE 802 determines that the number of repetitions of the uplink signal transmission cannot be transmitted in the portion of the frequency band based on a slot format associated with the portion of the frequency band. For example, the UE 802 may determine that the number of uplink slots in the slot format associated with the portion of the frequency band may be less than the number of repetitions of the uplink signal transmission (e.g., the number of uplink slots in the slot format associated with the portion of the frequency band is less than N).

At 812, the UE 802 determines a different slot format for the portion of the frequency band which enables transmission of the number of repetitions of the uplink signal transmission. The UE 802 then transmits the number of repetitions of the uplink signal transmission in the portion of the frequency band using the different slot format. For example, the UE 802 may transmit the first repetition of an uplink signal 814 through the Nth repetition of uplink signal 816. In some scenarios, if a different slot format which enables transmission of the number of repetitions of the uplink signal transmission is not available (e.g., no slot formats include a sufficient number of uplink slots), the UE 802 may determine a slot format with the most uplink slots and may drop repetitions in slots designated as downlink slots.

Figure 9A:
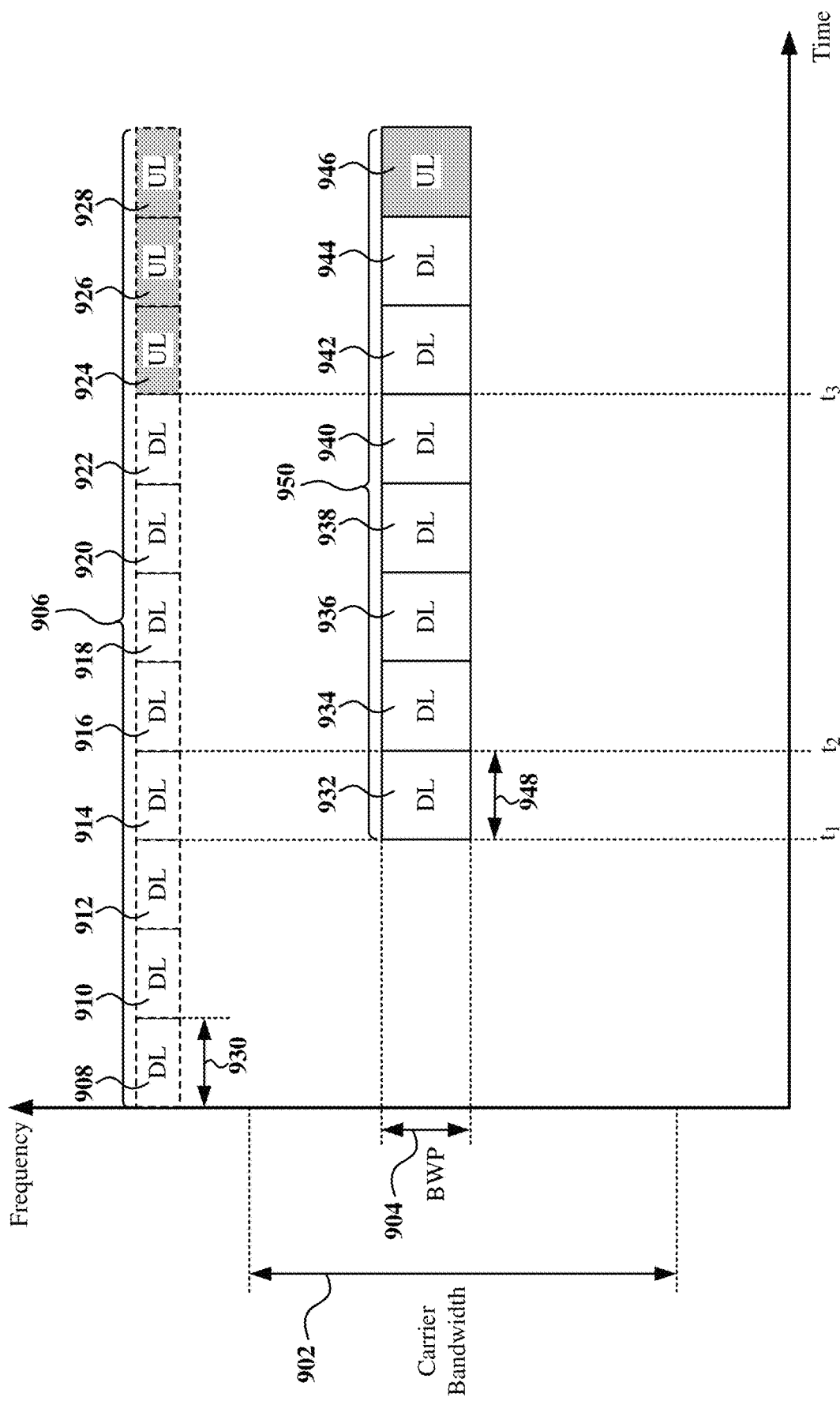
FIGS. 9A and 9B illustrate a portion of a frequency band allocated to a UE and a number of slots associated with the portion of the frequency band.
Figure 9B:
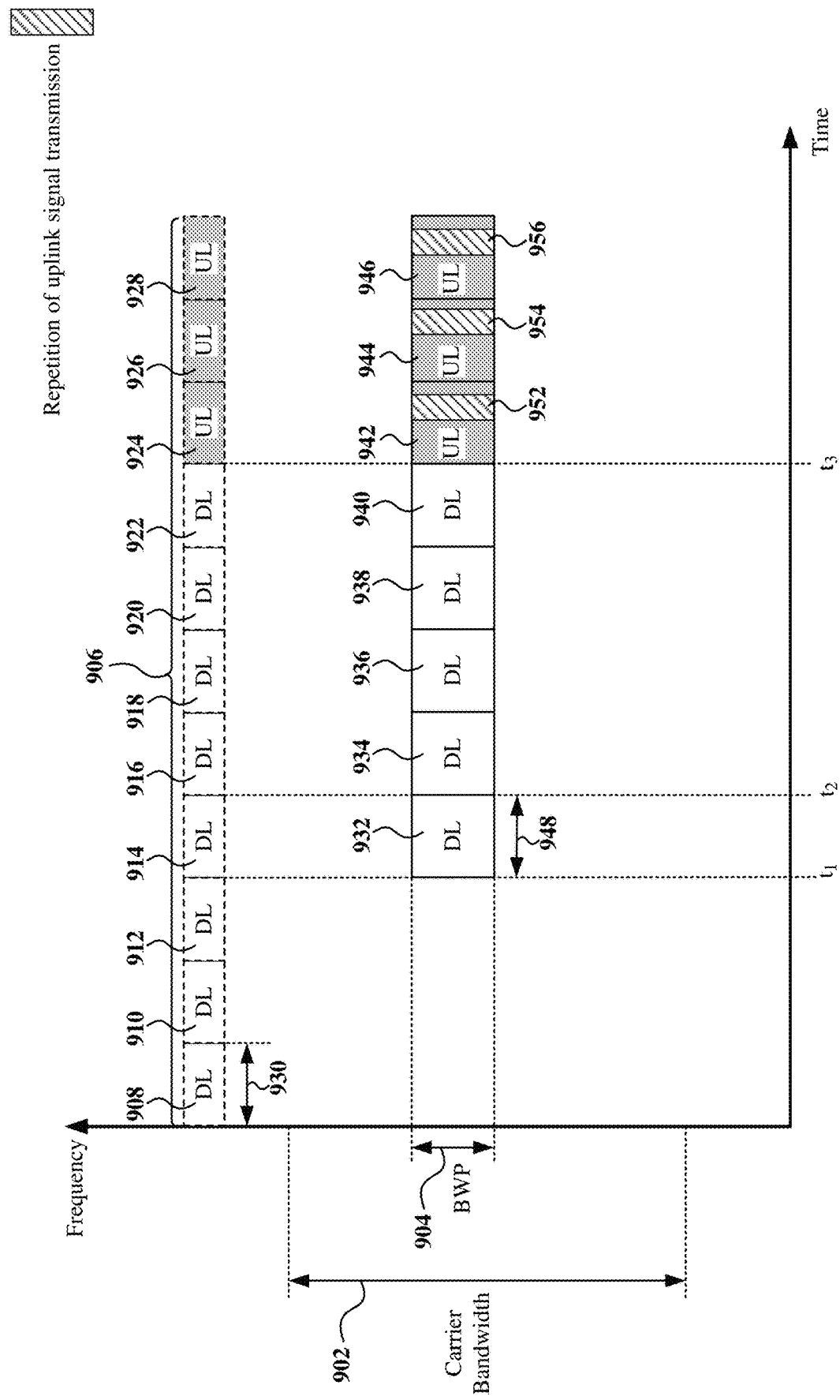

A first example scenario for the operations 810 and 812 in FIG. 8 will now be described with reference to FIGS. 9A and 9B. FIGS. 9A and 9B illustrate a portion of a frequency band allocated to the UE 802 and a number of slots associated with the portion of the frequency band. For example, the frequency band may be the carrier bandwidth 902 and the portion of the frequency band may be the flexible bandwidth part (BWP) 904. A first slot format 906 (e.g., an underlying slot format) may be associated with the carrier bandwidth 902 and a second slot format 950 may be associated with the flexible BWP 904.

The first slot format 906 may designate eight slots (e.g., slots 908, 910, 912, 914, 916, 918, 920, and 922) as downlink slots and three slots (e.g., slots 924, 926, 928) as uplink slots. The second slot format 950 may designate seven slots (e.g., slots 932, 934, 936, 938, 940, 942, and 944) as downlink slots and one slot (e.g., slot 946) as an uplink slot. Each of the slots 908 through 928 may have a first slot duration 930 and each of the slots 932 through 946 may have a second slot duration 948. In the example of FIG. 9A, the first and second slot durations 930, 948 may be equal.

If the UE 802 has determined that three repetitions (e.g., N=3) of an uplink signal transmission are to be transmitted in the portion of the frequency band (e.g., in the flexible BWP 904), three uplink slots may be needed in the portion of the frequency band. If the number of uplink slots in the second slot format 950 is less than the number of repetitions of the uplink signal transmission, the UE 802 may determine that the three repetitions of the uplink signal transmission cannot be transmitted in the portion of the frequency band (e.g., in the flexible BWP 904). Since the second slot format 950 associated with the flexible BWP 904 designates one slot (e.g., slot 946) as an uplink slot, the UE 802 may determine that three repetitions of an uplink signal transmission cannot be transmitted in the portion of the frequency band (e.g., in the flexible BWP 904) based on the second slot format 950.

If the number of uplink slots in the first slot format 906 is greater than or equal to the number of repetitions of the uplink signal transmission, the UE 802 may apply the first slot format 906 to the portion of the frequency band (e.g., in the flexible BWP 904) instead of the second slot format 950. Since the first slot format 906 shown in FIG. 9A associated with the carrier bandwidth 902 includes three uplink slots (e.g., at slots 924, 926, 928), the UE 802 may apply the first slot format 906 to the portion of the frequency band (e.g., in the flexible BWP 904). This may change slots 942, 944, 946 to uplink slots as shown in FIG. 9B.

The UE 802 may use the slots 942, 944, 946 to transmit the three repetitions of the uplink signal transmission. In some examples, the UE 802 may transmit one repetition of the uplink signal transmission per slot. For example, as shown in FIG. 9B, the UE 802 may transmit a first repetition of the uplink signal transmission 952 in the slot 942, a second repetition of the uplink signal transmission 954 in the slot 944, and a third repetition of the uplink signal transmission 956 in the slot 946. In some examples, the first repetition of the uplink signal transmission 952 may correspond to the first repetition of the uplink signal 814 in FIG. 8, and the third repetition of the uplink signal transmission 956 may correspond to the Nth repetition of the uplink signal 816 in FIG. 8.

Figure 10A:
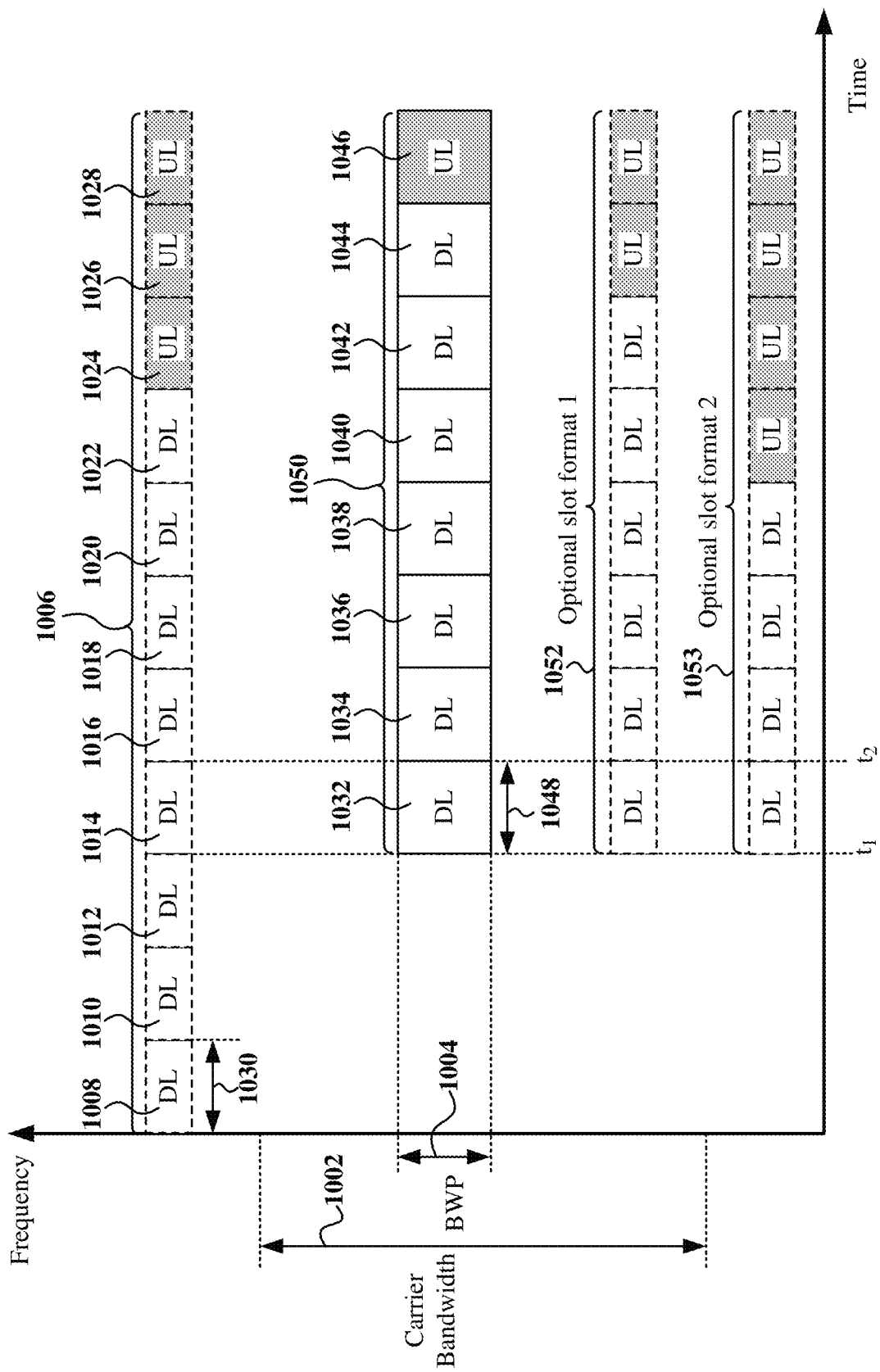
FIGS. 10A and 10B illustrate a portion of a frequency band allocated to a UE and a number of slots associated with the portion of the frequency band.
Figure 10B:
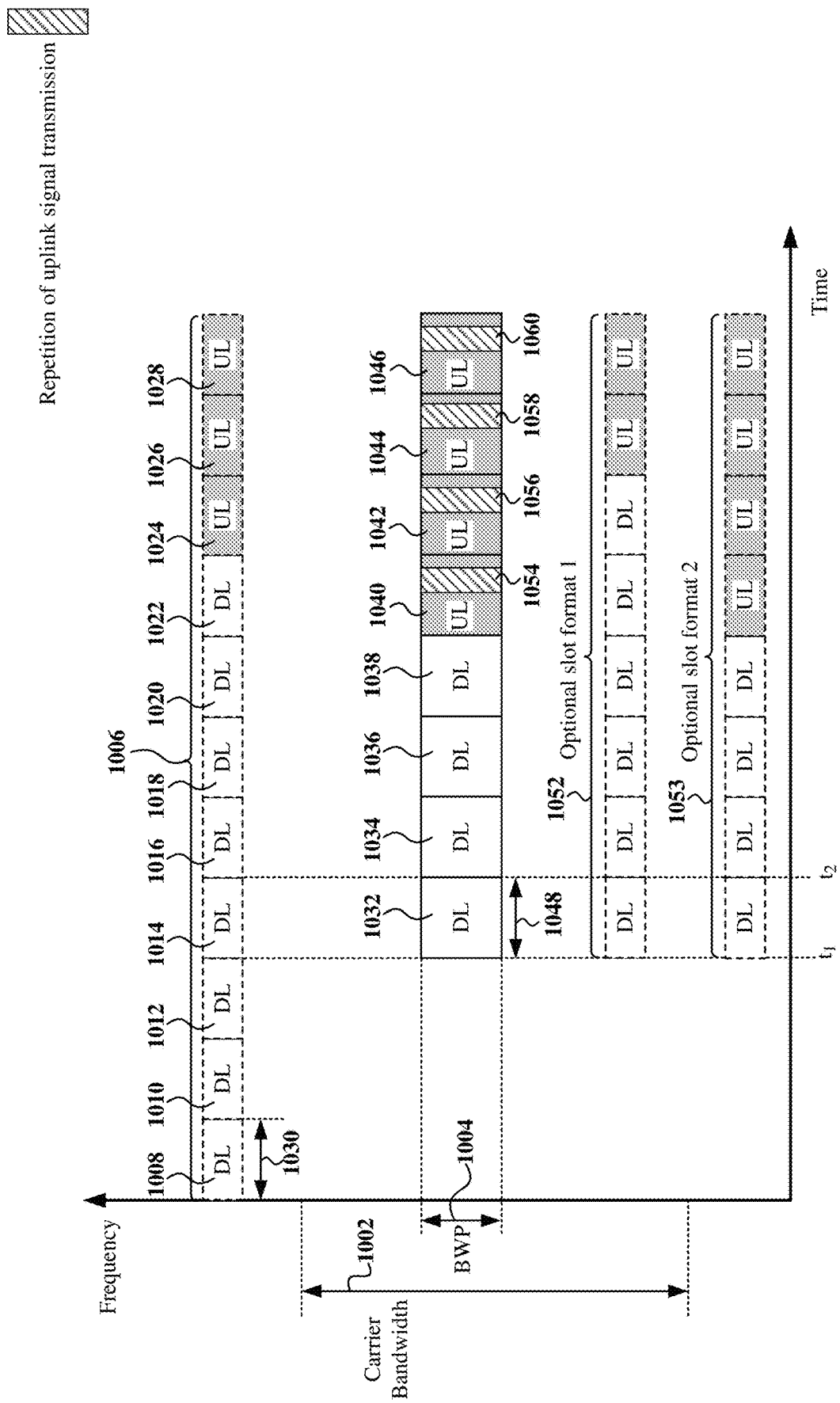

A second example scenario for the operations 810 and 812 in FIG. 8 will now be described with reference to FIGS. 10A and 10B. FIGS. 10A and 10B illustrate a portion of a frequency band allocated to the UE 802 and a number of slots associated with the portion of the frequency band. For example, the frequency band may be the carrier bandwidth 1002 and the portion of the frequency band may be the flexible bandwidth part (BWP) 1004. A first slot format 1006 (e.g., an underlying slot format) may be associated with the carrier bandwidth 1002 and a second slot format 1050 may be associated with the flexible BWP 1004. In some aspects of the disclosure, one or more optional slot formats may be associated with the portion of the frequency band (e.g., the flexible BWP 1004), such as a first optional slot format (also referred to as optional slot format 1) 1052 and a second optional slot format (also referred to as optional slot format 2) 1053. In other examples, a different number of optional slot formats with different arrangements of uplink and downlink slots than those shown in FIGS. 10A and 10B may be available to the UE 802.

The first slot format 1006 may designate eight slots (e.g., slots 1008, 1010, 1012, 1014, 1016, 1018, 1020, and 1022) as downlink slots and three slots (e.g., slots 1024, 1026, 1028) as uplink slots. The second slot format 1050 may designate seven slots (e.g., slots 1032, 1034, 1036, 1038, 1040, 1042, and 1044) as downlink slots and one slot (e.g., slot 1046) as an uplink slot. Each of the slots 1008 through 1028 may have a first slot duration 1030 and each of the slots 1032 through 1046 may have a second slot duration 1048. In the example of FIG. 10A, the first and second slot durations 1030, 1048 may be equal.

If the UE 802 has determined that four repetitions (e.g., N=4) of an uplink signal transmission are to be transmitted in the portion of the frequency band (e.g., in the flexible BWP 1004), at least four uplink slots may be needed in the portion of the frequency band. If the number of uplink slots in the second slot format 1050 is less than the number of repetitions of the uplink signal transmission, the UE 802 may determine that the four repetitions of the uplink signal transmission cannot be transmitted in the portion of the frequency band (e.g., in the flexible BWP 1004). Since the second slot format 1050 associated with the flexible BWP 1004 designates one slot (e.g., slot 1046) as an uplink slot, the UE 802 may determine that four repetitions of an uplink signal transmission cannot be transmitted in the portion of the frequency band (e.g., in the flexible BWP 1004) based on the second slot format 1050.

If the number of uplink slots in the first slot format 1006 is greater than or equal to the number of repetitions of the uplink signal transmission, the UE 802 may apply the first slot format 1006 to the portion of the frequency band (e.g., in the flexible BWP 1004) instead of the second slot format 1050. Since the first slot format 1006 shown in FIG. 10A associated with the carrier bandwidth 1002 includes three uplink slots (e.g., at slots 1024, 1026, 1028), the UE 802 may determine that four repetitions of an uplink signal transmission cannot be transmitted in the portion of the frequency band (e.g., in the flexible BWP 1004) based on the first slot format 1006.

If the number of uplink slots in one of the optional slot formats associated with the portion of the frequency band (e.g., the flexible BWP 1004) is greater than or equal to the number of repetitions of the uplink signal transmission, the UE 802 may apply that optional slot format to the portion of the frequency band (e.g., the flexible BWP 1004). In some examples, one slot format may be active for the flexible BWP 1004 at a given time, such as the second slot format 1050, the first optional slot format 1052, or the second optional slot format 1053. Since the second optional slot format 1053 includes four uplink slots, the UE 802 may apply the second optional slot format 1053 to the portion of the frequency band (e.g., in the flexible BWP 1004). This may change slots 1040, 1042, 1044, 1046 corresponding to the uplink slots in the second optional slot format 1053 to uplink slots as shown in FIG. 10B.

The UE 802 may use the slots 1040, 1042, 1044, 1046 to transmit the four repetitions of the uplink signal transmission. For example, as shown in FIG. 10B, the UE 802 may transmit a first repetition of the uplink signal transmission 1054 in the slot 1040, a second repetition of the uplink signal transmission 1056 in the slot 1042, a third repetition of the uplink signal transmission 1058 in the slot 1044, and a fourth repetition of the uplink signal transmission 1060 in the slot 1046. In some examples, the first repetition of the uplink signal transmission 1054 may correspond to the first repetition of the uplink signal 814 in FIG. 8, and the fourth repetition of the uplink signal transmission 1060 may correspond to the Nth repetition of the uplink signal 816 in FIG. 8.

Figure 11:
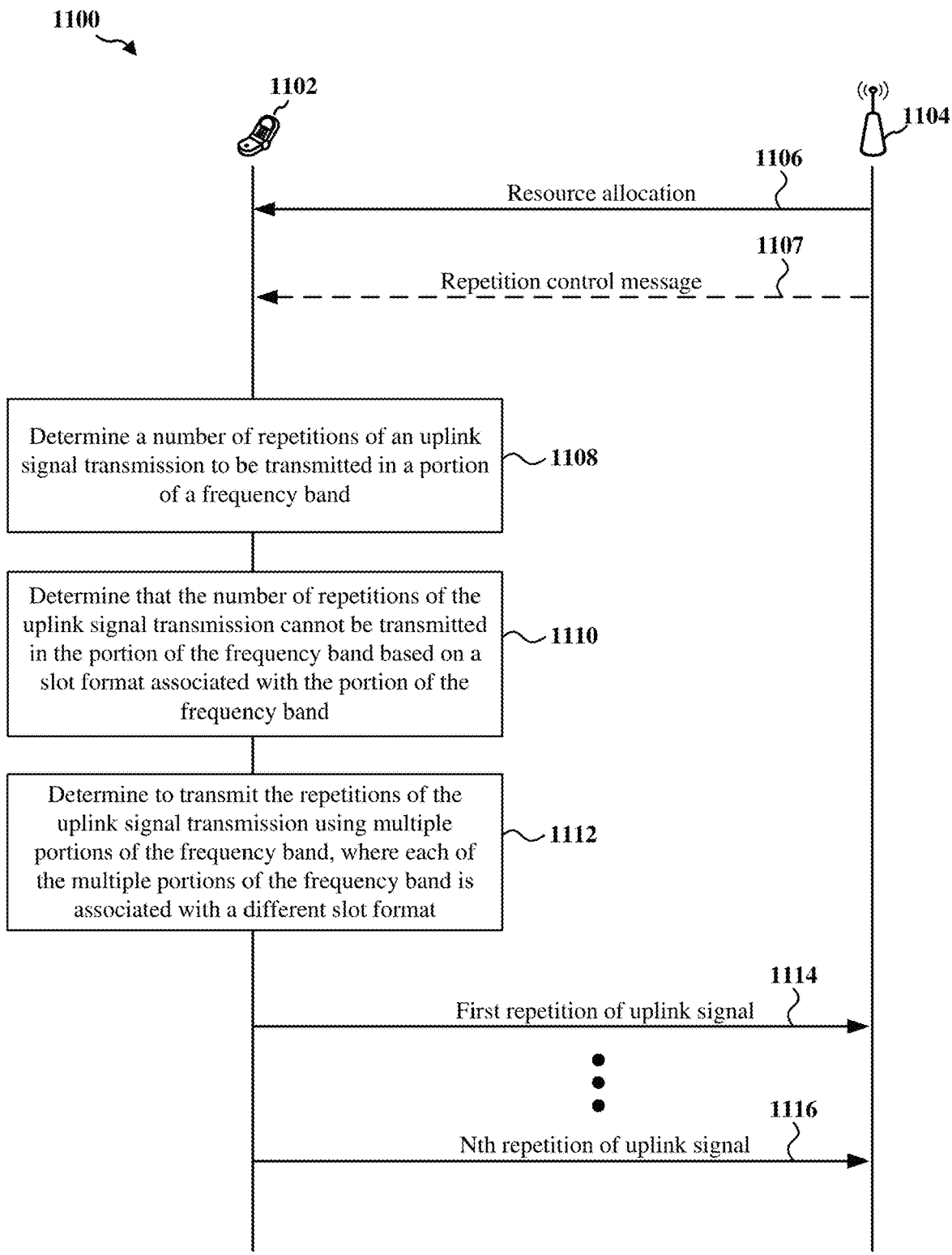
FIG. 11 illustrates a signal flow diagram in accordance with various aspects of the disclosure.

FIG. 11 illustrates a signal flow diagram 1100 in accordance with various aspects of the disclosure. The signal flow diagram 1100 includes a UE 1102 and a base station 1104. As shown in FIG. 11, the UE 1102 receives a resource allocation 1106 from the base station 1104. The resource allocation 1106 may include multiple portions of a frequency band. For example, each of the multiple portions of a frequency band may be a flexible BWP.

In some aspects of the disclosure, the UE 1102 may optionally receive a repetition control message 1107 from the base station 1104. In some examples, the repetition control message 1107 may identify at least first and second portions of the frequency band that the UE 1102 should use for transmitting repetitions of an uplink signal transmission. In some examples, the repetition control message 1107 may indicate a certain slot format (e.g., a TDD pattern) for each of the at least first and second portions of the frequency band.

In some examples, the repetition control message 1107 may indicate multiple portions of a frequency band the UE 1102 should use for transmitting repetitions of an uplink signal transmission. In further examples, the repetition control message 1107 may permit the UE 1102 to use the multiple portions of a frequency band for the repetitions of an uplink signal transmission or may prohibit the UE 1102 from using the multiple portions of the frequency band for the repetitions of an uplink signal transmission.

At 1108, the UE 1102 determines a number of repetitions of an uplink signal transmission to be transmitted in the portion of the frequency band allocated to the UE 1102 for repetitions of an uplink signal transmission. In the examples described herein, the number of repetitions may be expressed as a value of N, where N represents a positive integer greater than or equal to two. The number of repetitions (e.g., N) may include an initial transmission of an uplink signal transmission from the UE 1102 (also referred to as a first repetition of the uplink signal transmission) and subsequent transmissions of that same uplink signal transmission from the UE 1102. In one example, the UE 1102 may determine that three repetitions of an uplink signal transmission (e.g., N=3) are to be transmitted in the portion of the frequency band.

At 1110, the UE 1102 determines that the number of repetitions of the uplink signal transmission cannot be transmitted in the portion of the frequency band based on a slot format associated with the portion of the frequency band. For example, the UE 1102 may determine that the number of uplink slots in the slot format associated with the portion of the frequency band may be less than the number of repetitions of the uplink signal transmission (e.g., the number of uplink slots in the slot format associated with the portion of the frequency band is less than N).

At 1112, the UE 1102 determines to transmit the repetitions of the uplink signal transmission using multiple portions of the frequency band, where each of the multiple portions of the frequency band is associated with a different slot format. For example, the multiple portions of the frequency band and the different slot formats associated with the multiple portions of the frequency band may increase the likelihood that the UE 1102 will find an available uplink slot for each successive repetition of the uplink signal transmission. This may allow the UE 1102 to transmit the repetitions of the uplink signal transmission with low latency.

The UE 1102 then transmits the number of repetitions of the uplink signal transmission using the multiple portions of the frequency band. For example, the UE 1102 may transmit the first repetition of an uplink signal 1114 through the Nth repetition of uplink signal 1116.

Figure 12:
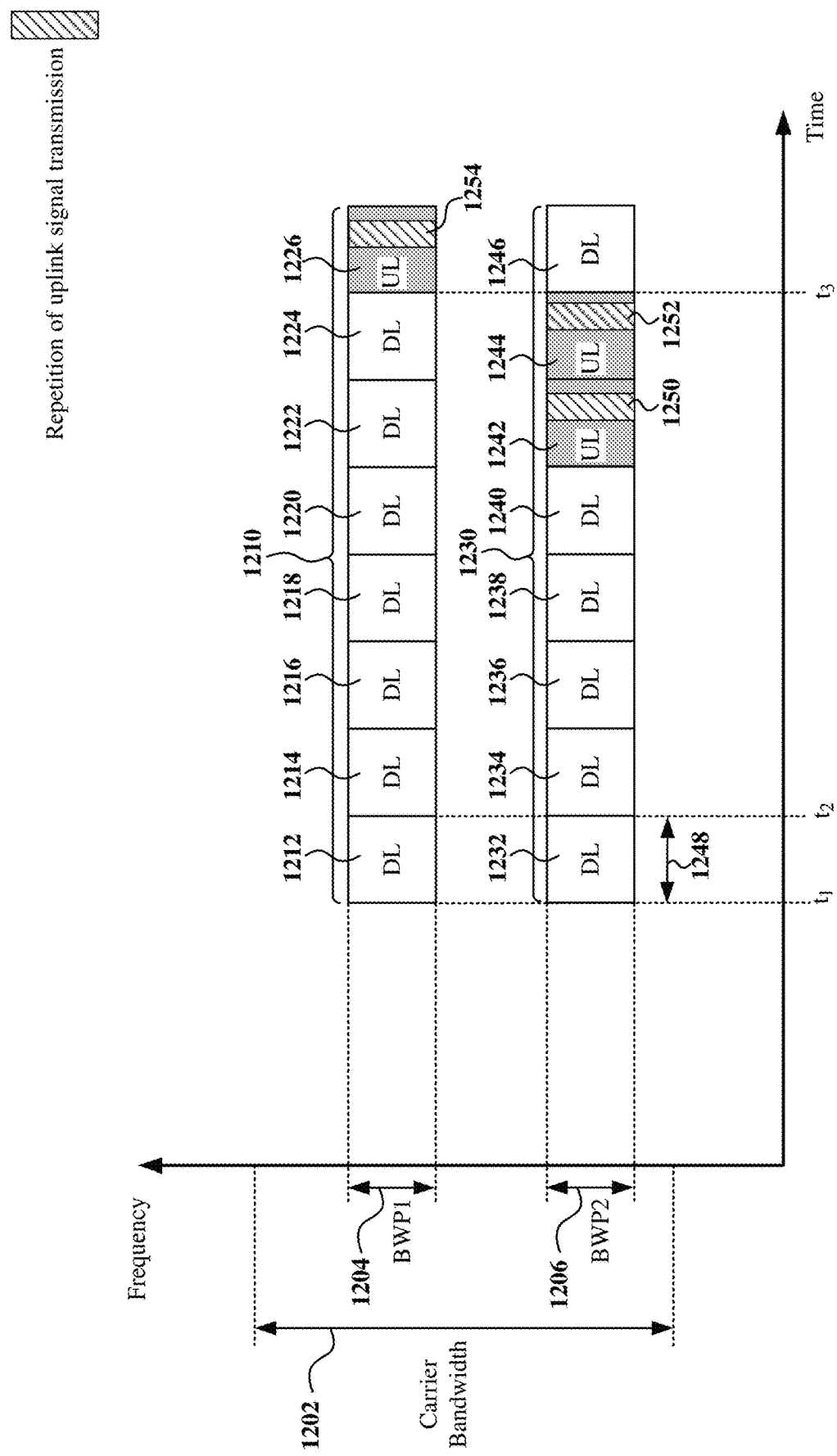
FIG. 12 illustrates first and second portions of a frequency band allocated to a UE, a first number of slots associated with the first portion of the frequency band, and a second number of slots associated with the second portion of the frequency ban.

An example of the operations 1110 and 1112 in FIG. 11 will now be described with reference to FIG. 12. FIG. 12 illustrates first and second portions of a frequency band allocated to the UE 1102, a first number of slots associated with the first portion of the frequency band, and a second number of slots associated with the second portion of the frequency band. For example, the frequency band may be the carrier bandwidth 1202, the first portion of the frequency band may be the first flexible bandwidth part (BWP1) 1204, and the second portion of the frequency band may be the second flexible bandwidth part (BWP2) 1206. A first slot format 1210 may be associated with the flexible BWP1 1204 and a second slot format 1230 may be associated with the flexible BWP2 1206.

The first slot format 1210 may designate seven slots (e.g., slots 1212, 1214, 1216, 1218, 1220, 1222, and 1224) as downlink slots and one slot (e.g., slot 1226) as an uplink slot. The second slot format 1230 may designate six slots (e.g., slots 1232, 1234, 1236, 1238, 1240, and 1246) as downlink slots and two slots (e.g., slots 1242, 1244) as uplink slots. Each of the slots 1212 through 1226 and slots 1232 through 1246 may have a slot duration 1248.

In one example, if the UE 1102 has determined that three repetitions (e.g., N=3) of an uplink signal transmission are to be transmitted in the second portion of the frequency band (e.g., in the flexible BWP2 1206), three uplink slots may be needed in the second portion of the frequency band. If the number of uplink slots in the second slot format 1230 is less than the number of repetitions of the uplink signal transmission, the UE 1102 may determine that the three repetitions of the uplink signal transmission cannot be transmitted in the second portion of the frequency band (e.g., in the flexible BWP2 1206). Since the second slot format 1230 associated with the flexible BWP2 1206 designates two slots (e.g., slots 1242, 1244) as uplink slots, the UE 1102 may determine that three repetitions of an uplink signal transmission cannot be transmitted in the second portion of the frequency band (e.g., in the flexible BWP2 1206) based on the second slot format 1230.

In some examples, if a current slot is designated as an uplink slot in the portion of the frequency band allocated for the transmission of the repetitions of the uplink signal, the UE 1102 may transmit a repetition of the uplink signal transmission in that current slot. If the current slot is not designated as an uplink slot (e.g., the current slot is designated as a downlink slot) in the portion of the frequency band allocated for the transmission of the repetitions of the uplink signal, the UE 1102 may determine whether the current slot in a different portion of the frequency band configured for the UE 1102 is designated as an uplink slot. If an uplink slot is designated, the UE 1102 may transmit a repetition of the uplink signal in the uplink slot of the different portion of the frequency band.

For example, with reference to FIG. 12, if the current slot is slot 1242 (e.g., an uplink slot), the UE 1102 may transmit a first repetition of the uplink signal 1250 in slot 1242. Thereafter, the next slot (e.g., slot 1244) would represent the current slot. Since slot 1244 is also designated as an uplink slot, the UE 1102 may transmit a second repetition of the uplink signal 1252 in slot 1244. When slot 1246 (e.g., a downlink slot) represents the current slot, the UE 1102 may not be able to transmit the third repetition of the uplink signal. In this case, the UE 1102 may determine that the current slot in the first portion of the frequency band (e.g., the flexible BWP1 1204), such as slot 1226, is designated as an uplink slot. The UE 1102 may transmit the third repetition of the uplink signal 1254 in the first portion of the frequency band (e.g., the flexible BWP1 1204) at slot 1226.

In some examples, the repetition control message 807, 1107 may indicate a portion of a frequency band the UE 802, 1102 should use for transmitting repetitions of an uplink signal transmission and a slot format (e.g., a TDD pattern) that the UE 807, 1102 should apply to the portion of a frequency band using a multi-bit indicator. In one example, the multi-bit indicator may include two bits. In this example, each unique combination of bit values of the multi-bit indicator may be mapped to a certain portion of a bandwidth (e.g., a certain flexible BWP) and a certain slot format, or other information.

In one example scenario, a first combination of bit values '00' of the multi-bit indicator may indicate to the UE (e.g., UE 807, 1107) to apply a slot format associated with a frequency band for a portion of the frequency band allocated to the UE (e.g., instead of a slot format associated with the portion of the frequency band), a second combination of bit values '01' of the multi-bit indicator may indicate to the UE to use a first portion of the frequency band and to apply a first slot format to the first portion of the frequency band, a third combination of bit values '10' of the multi-bit indicator may indicate to the UE to use a second portion of the frequency band and to apply a second slot format to the second portion of the frequency band, and a fourth combination of bit values '11' of the multi-bit indicator may indicate to the UE to use a third portion of the frequency band and to apply a third slot format to the third portion of the frequency band.

FIG. 13 is a flowchart 1300 of a method of wireless communication. The method may be performed by a UE (e.g., the UE 104, 802; the apparatus 1602/1602'; the processing system 1714, which may include the memory 360 and which may be the entire UE 104, 802 or a component of the UE 104, 802, such as the TX processor 368, the RX processor 356, and/or the controller/processor 359). It should be understood that operations indicated with dashed lines represent optional operations.

At 1302, the UE receives a resource allocation in a frequency band, the resource allocation including at least one portion of the frequency band, wherein a first slot format is associated with the frequency band and a second slot format is associated with the at least one portion of the frequency band. For example, with reference to FIG. 8, the UE 802 may receive a resource allocation 806 from the base station 804. The resource allocation 806 may include one or more portions of a frequency band, such as one or more flexible BWPs.

At 1304, the UE receives a control message identifying frequency resources of the at least one portion of the frequency band to be used for repetitions of an uplink signal transmission. For example, with reference to FIG. 8, the UE 802 may receive a repetition control message 807 from the base station 804. In some examples, the repetition control message 807 may indicate a certain flexible bandwidth part, such as the flexible BWP 904 in FIGS. 9A and 9B, that the UE 802 should use for transmitting repetitions of an uplink signal transmission.

At 1306, the UE transmits a number of repetitions of an uplink signal transmission in the at least one portion of the frequency band based on the first slot format when the number of repetitions of the uplink signal transmission cannot be transmitted in the at least one portion of the frequency band based on the second slot format.

In some examples, the number of repetitions of the uplink signal transmission cannot be transmitted in the at least one portion of the frequency band based on the second slot format when a number of uplink slots in the second slot format is less than the number of repetitions of the uplink signal transmission. In some examples, the first slot format includes a first number of uplink slots and the second slot format includes a second number of uplink slots, wherein the first number of uplink slots exceeds the second number of uplink slots. In some examples, a first number of uplink slots in the first slot format is greater than or equal to the number of repetitions of the uplink signal transmission, and a second number of uplink slots in the second slot format is less than the number of repetitions of the uplink signal transmission.

For example, with reference to FIG. 8, the UE 802 (e.g., at 808) may determine a number (e.g., N) of repetitions of an uplink signal transmission to be transmitted in the portion of the frequency band allocated to the UE 802. The UE 802 (e.g., at 810) may determine that the number of repetitions of the uplink signal transmission cannot be transmitted in the portion of the frequency band based on a slot format associated with the portion of the frequency band. The UE 802 (e.g., at 812) may determine a different slot format for the portion of the frequency band which enables transmission of the number of repetitions of the uplink signal transmission.

For example, with reference to FIGS. 9A and 9B, if the UE 802 has determined that three repetitions (e.g., N=3) of an uplink signal transmission are to be transmitted in the portion of the frequency band (e.g., in the flexible BWP 904), three uplink slots may be needed in the portion of the frequency band. Since the second slot format 950 (shown in FIG. 9A) associated with the flexible BWP 904 designates one slot (e.g., slot 946) as an uplink slot, the UE 802 may determine that three repetitions of an uplink signal transmission cannot be transmitted in the portion of the frequency band (e.g., in the flexible BWP 904) based on the second slot format 950. Since the first slot format 906 (shown in FIG. 9A) associated with the carrier bandwidth 902 includes three uplink slots (e.g., at slots 924, 926, 928), the UE 802 may apply the first slot format 906 to the portion of the frequency band (e.g., in the flexible BWP 904). This may change slots 942, 944, 946 to uplink slots as shown in FIG. 9B. The UE 802 may use the slots 942, 944, 946 to transmit the three repetitions of the uplink signal transmission.

At 1308, the UE optionally applies the first slot format to the at least one portion of the frequency band after the number of repetitions of the uplink signal transmission are transmitted.

At 1310, the UE optionally applies the second slot format to the at least one portion of the frequency band after the number of repetitions of the uplink signal transmission are transmitted.

Figure 14:
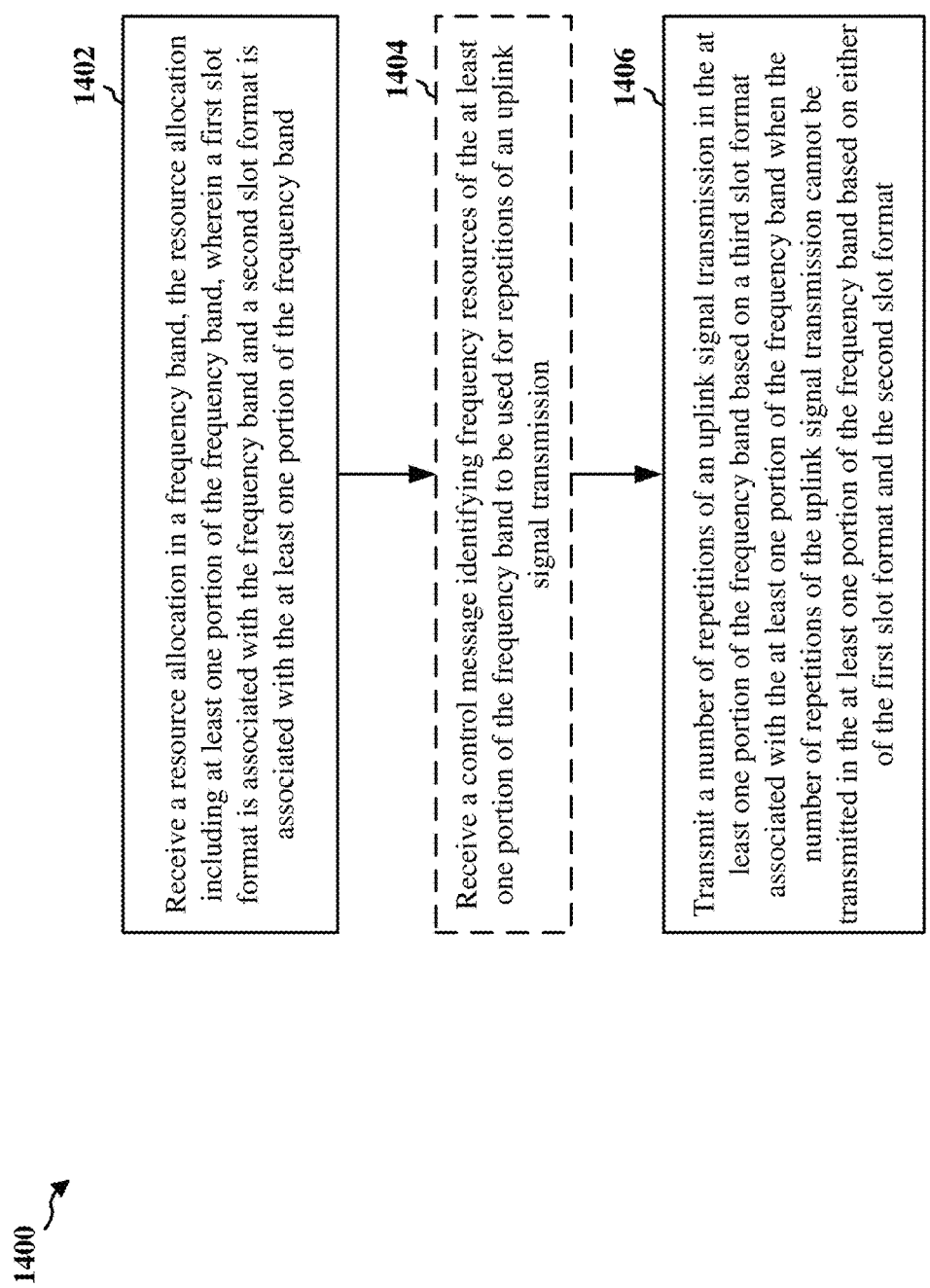
FIG. 14 is a flowchart of a method of wireless communication.

FIG. 14 is a flowchart 1400 of a method of wireless communication. The method may be performed by a UE (e.g., the UE 104, 802; the apparatus 1602/1602'; the processing system 1714, which may include the memory 360 and which may be the entire UE 104, 802 or a component of the UE 104, 802, such as the TX processor 368, the RX processor 356, and/or the controller/processor 359). It should be understood that operations indicated with dashed lines represent optional operations.

At 1402, the UE receives a resource allocation in a frequency band, the resource allocation including at least one portion of the frequency band, wherein a first slot format is associated with the frequency band and a second slot format is associated with the at least one portion of the frequency band. For example, with reference to FIG. 8, the UE 802 may receive a resource allocation 806 from the base station 804. The resource allocation 806 may include one or more portions of a frequency band, such as one or more flexible BWPs.

At 1404, the UE receives a control message identifying frequency resources of the at least one portion of the frequency band to be used for repetitions of an uplink signal transmission. For example, with reference to FIG. 8, the UE 802 may receive a repetition control message 807 from the base station 804. In some examples, the repetition control message 807 may indicate a certain flexible bandwidth part, such as the flexible BWP 1004 in FIGS. 10A and 10B, that the UE 802 should use for transmitting repetitions of an uplink signal transmission.

At 1406, the UE transmits a number of repetitions of an uplink signal transmission in the at least one portion of the frequency band based on a third slot format associated with the at least one portion of the frequency band when the number of repetitions of the uplink signal transmission cannot be transmitted in the at least one portion of the frequency band based on either of the first slot format and the second slot format.

In some examples, the number of repetitions of the uplink signal transmission cannot be transmitted in the at least one portion of the frequency band based on either of the first and second slot formats when a first number of uplink slots in the first slot format is less than the number of repetitions of the uplink signal transmission and a second number of uplink slots in the second slot format is less than the number of repetitions of the uplink signal transmission. In some examples, the first slot format includes a first number of uplink slots, the second slot format includes a second number of uplink slots, and the third slot format includes a third number of uplink slots, wherein the third number of uplink slots exceeds the first number of uplink slots and exceeds the second number of uplink slots. In some examples, a first number of uplink slots in the first slot format is less than the number of repetitions of the uplink signal transmission, a second number of uplink slots in the second slot format is less than the number of repetitions of the uplink signal transmission, and a third number of uplink slots in the third slot format is greater than or equal to the number of repetitions of the uplink signal transmission.

For example, with reference to FIG. 8, the UE 802 (e.g., at 808) may determine a number (e.g., N) of repetitions of an uplink signal transmission to be transmitted in the portion of the frequency band allocated to the UE 802. The UE 802 (e.g., at 810) may determine that the number of repetitions of the uplink signal transmission cannot be transmitted in the portion of the frequency band based on a slot format associated with the portion of the frequency band. The UE 802 (e.g., at 812) may determine a different slot format for the portion of the frequency band which enables transmission of the number of repetitions of the uplink signal transmission.

For example, with reference to FIGS. 10A and 10B, if the UE 802 has determined that four repetitions (e.g., N=4) of an uplink signal transmission are to be transmitted in the portion of the frequency band (e.g., in the flexible BWP 1004), at least four uplink slots may be needed in the portion of the frequency band. Since the second slot format 1050 (shown in FIG. 10A) associated with the flexible BWP 1004 designates one slot (e.g., slot 1046) as an uplink slot, the UE 802 may determine that four repetitions of an uplink signal transmission cannot be transmitted in the portion of the frequency band (e.g., in the flexible BWP 1004) based on the second slot format 1050. Furthermore, since the first slot format 1006 shown in FIG. 10A associated with the carrier bandwidth 1002 includes three uplink slots (e.g., at slots 1024, 1026, 1028), the UE 802 may determine that four repetitions of an uplink signal transmission also cannot be transmitted in the portion of the frequency band (e.g., in the flexible BWP 1004) based on the first slot format 1006.

In the example of FIG. 10A, the second optional slot format 1053 associated with the portion of the frequency band (e.g., the flexible BWP 1004) includes four uplink slots. Therefore, the UE 802 may apply the second optional slot format 1053 to the portion of the frequency band (e.g., in the flexible BWP 1004). This may change slots 1040, 1042, 1044, 1046 corresponding to the uplink slots in the second optional slot format 1053 to uplink slots as shown in FIG. 10B. The UE 802 may use the slots 1040, 1042, 1044, 1046 to transmit the four repetitions of the uplink signal transmission.

Figure 15:
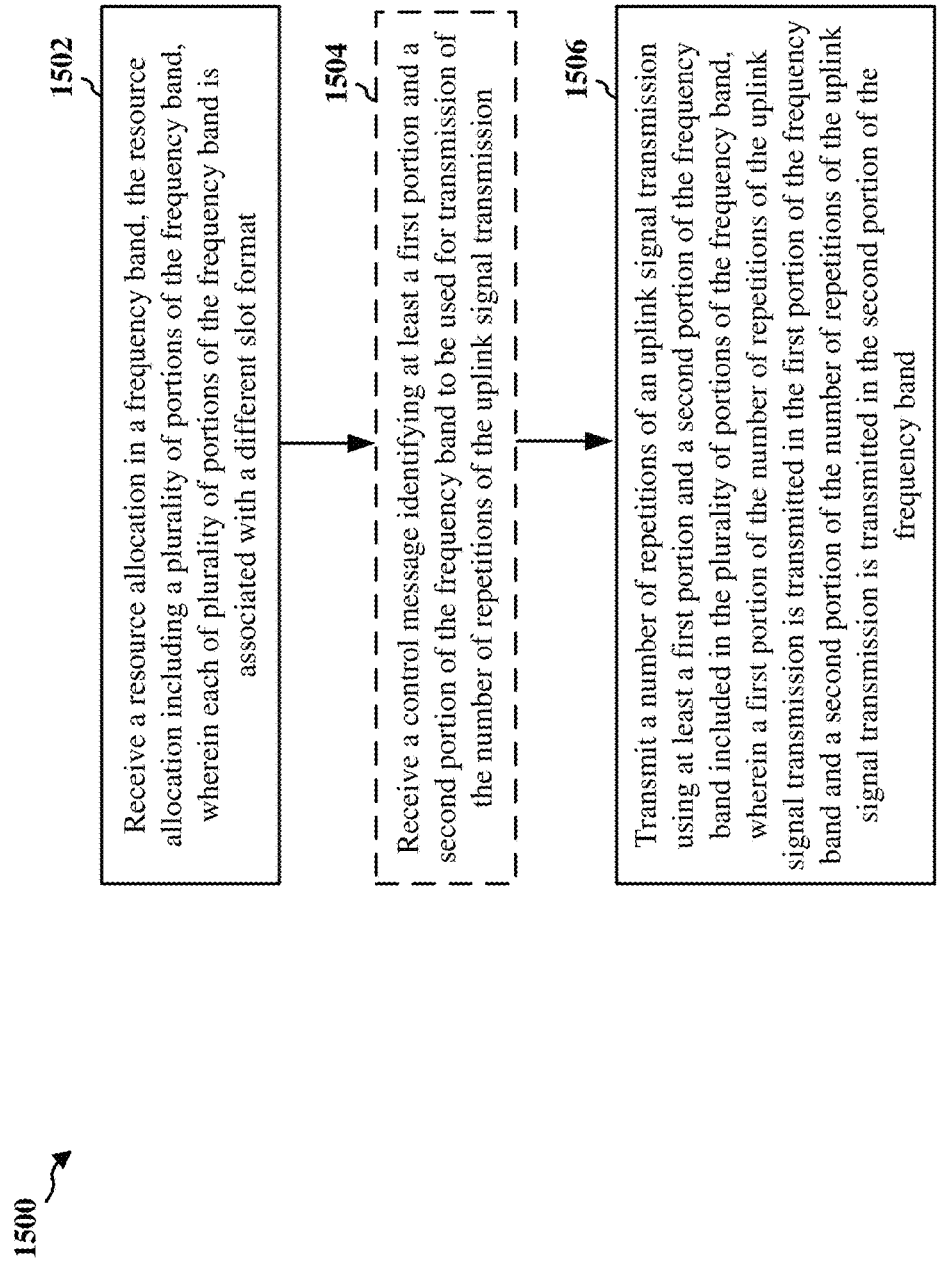
FIG. 15 is a flowchart of a method of wireless communication.

FIG. 15 is a flowchart 1500 of a method of wireless communication. The method may be performed by a UE (e.g., the UE 104, 1102; the apparatus 1602/1602'; the processing system 1714, which may include the memory 360 and which may be the entire UE 104, 1102 or a component of the UE 104, 1102, such as the TX processor 368, the RX processor 356, and/or the controller/processor 359). It should be understood that operations indicated with dashed lines represent optional operations.

At 1502, the UE receives a resource allocation in a frequency band, the resource allocation including a plurality of portions of the frequency band, wherein each of plurality of portions of the frequency band is associated with a different slot format. For example, with reference to FIG. 11, the UE 1102 may receive a resource allocation 1106 from the base station 1104. The resource allocation 1106 may include multiple portions of a frequency band. For example, each of the multiple portions of a frequency band may be a flexible BWP.

At 1504, the UE optionally receives a control message identifying at least a first portion and a second portion of the frequency band to be used for transmission of the number of repetitions of the uplink signal transmission. For example, with reference to FIG. 11, the UE 1102 may optionally receive a repetition control message 1107 from the base station 1104. In some examples, the repetition control message 1107 may identify at least a first portion and a second portion of the frequency band (e.g., the flexible BWP1 1204 and the flexible BWP2 1206) that the UE 1102 should use for transmitting repetitions of an uplink signal transmission. In some examples, the repetition control message 1107 may indicate a certain slot format (e.g., a TDD pattern) for each of the at least first and second portions of the frequency band.

At 1506, the UE transmits a number of repetitions of an uplink signal transmission using at least a first portion and a second portion of the frequency band included in the plurality of portions of the frequency band, wherein a first portion of the number of repetitions of the uplink signal transmission is transmitted in the first portion of the frequency band and a second portion of the number of repetitions of the uplink signal transmission is transmitted in the second portion of the frequency band.

In some examples, the second portion of the number of repetitions of the uplink signal transmission is transmitted in the second portion of the frequency band when a first current slot of the first portion of the frequency band is not an uplink slot and a second current slot of the second portion of the frequency band is the uplink slot, and wherein the first current slot is overlapping with the second current slot.

For example, with reference to FIGS. 11 and 12, if the UE 1102 has determined that three repetitions (e.g., N=3) of an uplink signal transmission are to be transmitted in the second portion of the frequency band (e.g., in the flexible BWP2 1206), three uplink slots may be needed in the second portion of the frequency band. Since the second slot format 1230 associated with the flexible BWP2 1206 designates two slots (e.g., slots 1242, 1244) as uplink slots, the UE 1102 may determine that three repetitions of an uplink signal transmission cannot be transmitted in the second portion of the frequency band (e.g., in the flexible BWP2 1206) based on the second slot format 1230. In some examples, if the current slot in the second portion of the frequency band (e.g., in the flexible BWP2 1206) is not designated as an uplink slot (e.g., the current slot is designated as a downlink slot) in the portion of the frequency band allocated for the transmission of the repetitions of the uplink signal, the UE 1102 may determine whether the current slot in a different portion of the frequency band configured for the UE 1102 is designated as an uplink slot.

For example, when the UE 1102 is using the second portion of the frequency band (e.g., in the flexible BWP2 1206) for uplink transmissions and when slot 1246 (e.g., a downlink slot) represents the current slot, the UE 1102 may not be able to transmit the third repetition of the uplink signal. In this case, the UE 1102 may determine that the current slot in the first portion of the frequency band (e.g., the flexible BWP1 1204), such as slot 1226, is designated as an uplink slot. The UE 1102 may transmit the third repetition of the uplink signal 1254 in the first portion of the frequency band (e.g., flexible BWP1 1204) at slot 1226.

Figure 16:
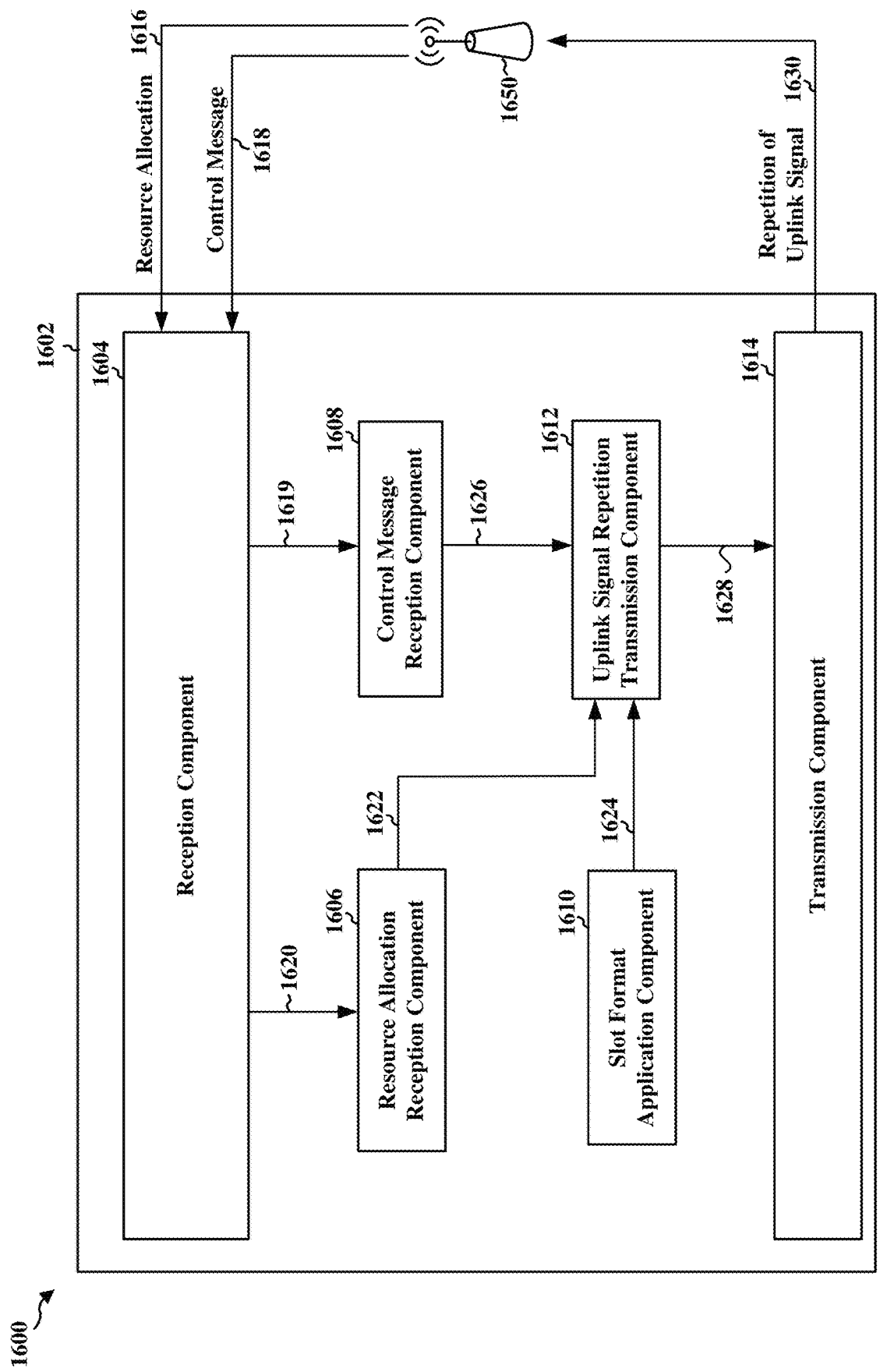
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a UE. The apparatus includes a reception component 1604 that receives downlink signals from a base station 1650, such as the resource allocation 1616 and/or the control message 1618. The apparatus includes a resource allocation reception component 1606 that receives the resource allocation 1616 via a signal 1620 from the reception component 1604. In some aspects, the resource allocation 1616 may allocate resources to the apparatus in a frequency band including at least one portion of the frequency band. A first slot format may be associated with the frequency band and a second slot format may be associated with the at least one portion of the frequency band. In some aspects, the resource allocation 1616 may allocate resources to the apparatus in a frequency band including a plurality of portions of the frequency band, wherein each of plurality of portions of the frequency band is associated with a different slot format.

The apparatus further includes a control message reception component 1608 that receives the control message 1618 (also referred to as a repetition control message) via a signal 1619 from the reception component 1604. In some aspects, the control message 1618 identifies frequency resources of the at least one portion of the frequency band to be used for repetitions of an uplink signal transmission. In some aspects, if a plurality of portions of the frequency band are allocated to the apparatus, the control message 1618 identifies at least first and second portions of the frequency band to be used for transmission of the number of repetitions of the uplink signal transmission.

The apparatus further includes a slot format application component 1610. In some aspects, the slot format application component 1610 provides a signal 1624 to the uplink signal repetition transmission component 1612 indicating a slot format to be applied to a portion of a frequency band. In some aspects, the slot format application component 1610 applies (e.g., via the signal 1624) the first slot format to the at least one portion of the frequency band after the number of repetitions of the uplink signal transmission are transmitted. In some aspects, the slot format application component 1610 applies (e.g., via the signal 1624) the second slot format to the at least one portion of the frequency band after the number of repetitions of the uplink signal transmission are transmitted.

The apparatus further includes an uplink signal repetition transmission component 1612. The uplink signal repetition transmission component 1612 may receive the resource allocation 1616 from the resource allocation reception component 1606 via a signal 1622 and the control message 1618 from the control message reception component 1608 via a signal 1626. The uplink signal repetition transmission component 1612 determines a number of repetitions of an uplink signal transmission to be transmitted in a portion of a frequency band and determines that the number of repetitions of the uplink signal transmission cannot be transmitted in the portion of the frequency band based on a slot format associated with the portion of the frequency band.

The uplink signal repetition transmission component 1612 determines a different slot format for the portion of the frequency band which enables transmission of the number of repetitions of the uplink signal transmission or determines to transmit the repetitions of the uplink signal transmission using multiple portions of the frequency band, where each of the multiple portions of the frequency band is associated with a different slot format.

The uplink signal repetition transmission component 1612 transmits a number of repetitions of an uplink signal transmission in the at least one portion of the frequency band based on the first slot format when the number of repetitions of the uplink signal transmission cannot be transmitted in the at least one portion of the frequency band based on the second slot format. The uplink signal repetition transmission component 1612 further transmits a number of repetitions of an uplink signal transmission in the at least one portion of the frequency band based on a third slot format associated with the at least one portion of the frequency band when the number of repetitions of the uplink signal transmission cannot be transmitted in the at least one portion of the frequency band based on either of the first and second slot formats. The uplink signal repetition transmission component 1612 further transmits a number of repetitions of an uplink signal transmission using at least first and second portions of the frequency band included in the plurality of portions of the frequency band, wherein a first portion of the number of repetitions of the uplink signal transmission is transmitted in the first portion of the frequency band and a second portion of the number of repetitions of the uplink signal transmission is transmitted in the second portion of the frequency band.

The apparatus includes a transmission component 1614 that transmits uplink signals to the base station 1650.

The apparatus may include additional components that perform each of the blocks of the algorithm in the aforementioned flowcharts of FIGS. 13-15. As such, each block in the aforementioned flowcharts of FIGS. 13-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
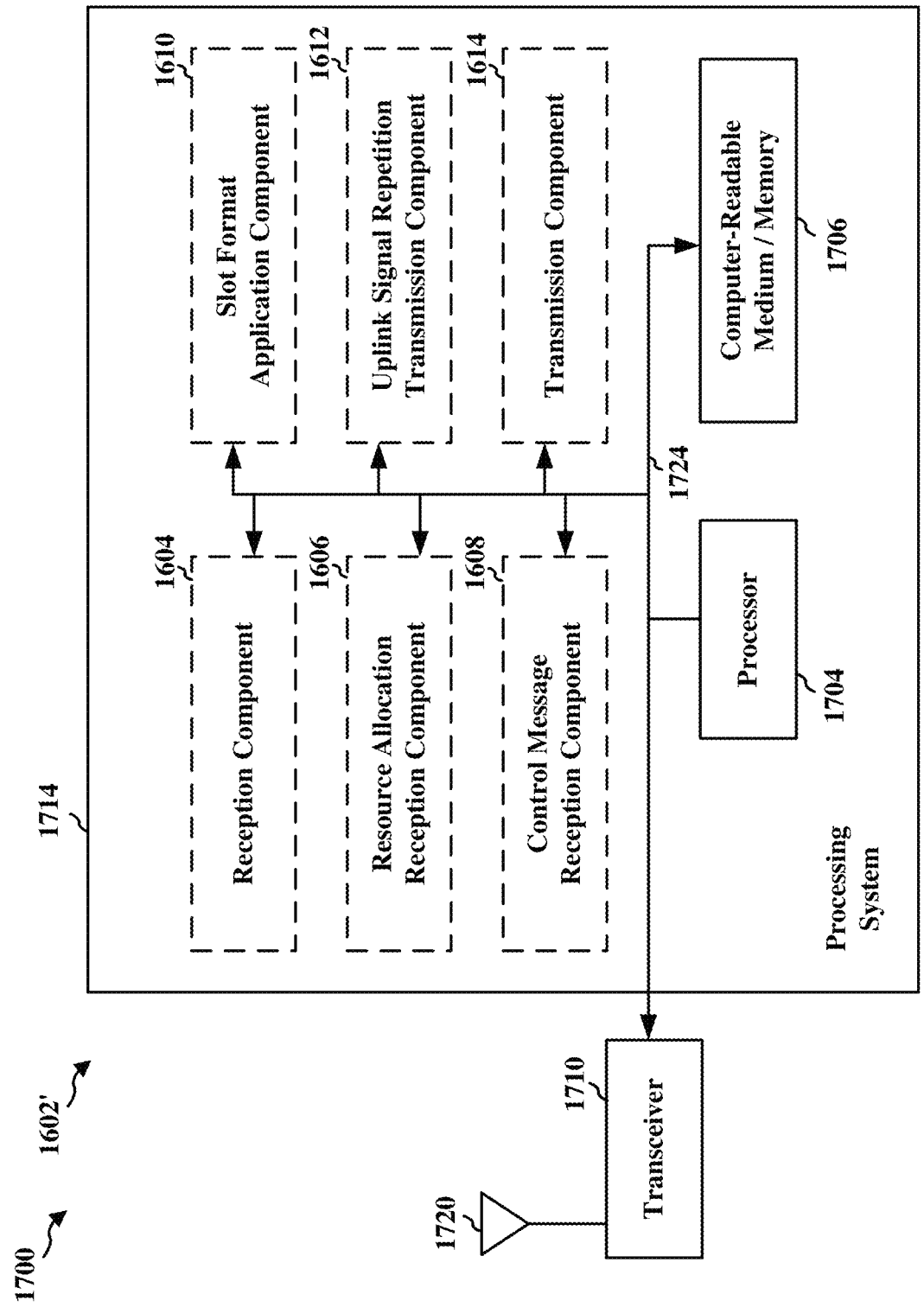
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1614, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359. Alternatively, the processing system 1714 may be the entire UE (e.g., see 350 of FIG. 3).

In one configuration, the apparatus 1602/1602' for wireless communication includes means for receiving a resource allocation in a frequency band, the resource allocation including at least one portion of the frequency band, wherein a first slot format is associated with the frequency band and a second slot format is associated with the at least one portion of the frequency band, means for receiving a control message identifying frequency resources of the at least one portion of the frequency band to be used for repetitions of an uplink signal transmission, means for receiving a resource allocation in a frequency band, the resource allocation including a plurality of portions of the frequency band, wherein each of plurality of portions of the frequency band is associated with a different slot format, means for applying the first slot format to the at least one portion of the frequency band after the number of repetitions of the uplink signal transmission are transmitted, means for applying the second slot format to the at least one portion of the frequency band after the number of repetitions of the uplink signal transmission are transmitted, means for receiving a control message identifying frequency resources of the at least one portion of the frequency band to be used for repetitions of an uplink signal transmission, means for receiving a control message identifying the at least first and second portions of the frequency band to be used for transmission of the number of repetitions of the uplink signal transmission, means for transmitting a number of repetitions of an uplink signal transmission in the at least one portion of the frequency band based on the first slot format when the number of repetitions of the uplink signal transmission cannot be transmitted in the at least one portion of the frequency band based on the second slot format, means for transmitting a number of repetitions of an uplink signal transmission in the at least one portion of the frequency band based on a third slot format associated with the at least one portion of the frequency band when the number of repetitions of the uplink signal transmission cannot be transmitted in the at least one portion of the frequency band based on either of the first and second slot formats, means for transmitting a number of repetitions of an uplink signal transmission using at least first and second portions of the frequency band included in the plurality of portions of the frequency band, wherein a first portion of the number of repetitions of the uplink signal transmission is transmitted in the first portion of the frequency band and a second portion of the number of repetitions of the uplink signal transmission is transmitted in the second portion of the frequency band.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Therefore, the aspects described herein may enable a UE (e.g., a UE 802, 1102) allocated with a portion of a frequency band (e.g., a flexible bandwidth part), or allocated with multiple portions of a frequency band (e.g., multiple flexible bandwidth parts), to transmit a number of repetitions of an uplink signal transmission when an amount of uplink resources (e.g., uplink slots) in the portion of the frequency band are insufficient. This may enable a UE to access the uplink resources needed to transmit the desired number of repetitions of an uplink signal transmission. In some scenarios, the uplink signal transmission may include a transport block that may not be successfully received (e.g., at a base station) without a suitable number of repetitions (e.g., in cases where a UE is experiencing poor channel conditions). Therefore, the aspects described herein may significantly improve the performance of the UE.

The following provides an overview of aspects of the present disclosure:

Aspect 1: An apparatus for wireless communication, comprising: a memory; and at least one processor coupled to the memory and configured to: receive a resource allocation in a frequency band, the resource allocation including at least one portion of the frequency band, wherein a first slot format is associated with the frequency band and a second slot format is associated with the at least one portion of the frequency band; and transmit a number of repetitions of an uplink signal transmission in the at least one portion of the frequency band based on the first slot format when the number of repetitions of the uplink signal transmission cannot be transmitted in the at least one portion of the frequency band based on the second slot format.

Aspect 2: The apparatus of aspect 1, wherein the number of repetitions of the uplink signal transmission cannot be transmitted in the at least one portion of the frequency band based on the second slot format when a number of uplink slots in the second slot format is less than the number of repetitions of the uplink signal transmission.

Aspect 3: The apparatus of aspect 1 or 2, wherein the first slot format includes a first number of uplink slots and the second slot format includes a second number of uplink slots, wherein the first number of uplink slots exceeds the second number of uplink slots.

Aspect 4: The apparatus of any of aspects 1 through 3, wherein a first number of uplink slots in the first slot format is greater than or equal to the number of repetitions of the uplink signal transmission, and a second number of uplink slots in the second slot format is less than the number of repetitions of the uplink signal transmission.

Aspect 5: The apparatus of any of aspects 1 through 4, wherein the at least one processor is further configured to: receive a control message identifying frequency resources of the at least one portion of the frequency band to be used for repetitions of the uplink signal transmission.

Aspect 6: The apparatus of any of aspects 1 through 5, wherein the at least one processor is further configured to: apply the first slot format to the at least one portion of the frequency band after the number of repetitions of the uplink signal transmission are transmitted.

Aspect 7: The apparatus of any of aspects 1 through 5, wherein the at least one processor is further configured to: apply the second slot format to the at least one portion of the frequency band after the number of repetitions of the uplink signal transmission are transmitted.

Aspect 8: A method of wireless communication, comprising: receiving a resource allocation in a frequency band, the resource allocation including at least one portion of the frequency band, wherein a first slot format is associated with the frequency band and a second slot format is associated with the at least one portion of the frequency band; and transmitting a number of repetitions of an uplink signal transmission in the at least one portion of the frequency band based on the first slot format when the number of repetitions of the uplink signal transmission cannot be transmitted in the at least one portion of the frequency band based on the second slot format.

Aspect 9: The method of aspect 8, wherein the number of repetitions of the uplink signal transmission cannot be transmitted in the at least one portion of the frequency band based on the second slot format when a number of uplink slots in the second slot format is less than the number of repetitions of the uplink signal transmission.

Aspect 10: The method of aspect 8 or 9, wherein the first slot format includes a first number of uplink slots and the second slot format includes a second number of uplink slots, wherein the first number of uplink slots exceeds the second number of uplink slots.

Aspect 11: The method of any of aspects 8 through 10, wherein a first number of uplink slots in the first slot format is greater than or equal to the number of repetitions of the uplink signal transmission, and a second number of uplink slots in the second slot format is less than the number of repetitions of the uplink signal transmission.

Aspect 12: The method of any of aspects 8 through 11, further comprising:
receiving a control message identifying frequency resources of the at least one portion of the frequency band to be used for repetitions of the uplink signal transmission.

Aspect 13: The method of any of aspects 8 through 12, further comprising: applying the first slot format to the at least one portion of the frequency band after the number of repetitions of the uplink signal transmission are transmitted.

Aspect 14: The method of any of aspects 8 through 12, further comprising: applying the second slot format to the at least one portion of the frequency band after the number of repetitions of the uplink signal transmission are transmitted.

Aspect 15: An apparatus for wireless communication, comprising: a memory; and at least one processor coupled to the memory and configured to: receive a resource allocation in a frequency band, the resource allocation including at least one portion of the frequency band, wherein a first slot format is associated with the frequency band and a second slot format is associated with the at least one portion of the frequency band; and transmit a number of repetitions of an uplink signal transmission in the at least one portion of the frequency band based on a third slot format associated with the at least one portion of the frequency band when the number of repetitions of the uplink signal transmission cannot be transmitted in the at least one portion of the frequency band based on either of the first slot format and the second slot format.

Aspect 16: The apparatus of aspect 15, wherein the at least one processor is further configured to: receive a control message identifying frequency resources of the at least one portion of the frequency band to be used for repetitions of the uplink signal transmission.

Aspect 17: The apparatus of aspect 15 or 16, wherein the number of repetitions of the uplink signal transmission cannot be transmitted in the at least one portion of the frequency band based on either of the first slot format and the second slot format when a first number of uplink slots in the first slot format is less than the number of repetitions of the uplink signal transmission and a second number of uplink slots in the second slot format is less than the number of repetitions of the uplink signal transmission.

Aspect 18: The apparatus of any of aspects 15 through 17, wherein the first slot format includes a first number of uplink slots, the second slot format includes a second number of uplink slots, and the third slot format includes a third number of uplink slots, wherein the third number of uplink slots exceeds the first number of uplink slots and exceeds the second number of uplink slots.

Aspect 19: The apparatus of any of aspects 15 through 18, wherein a first number of uplink slots in the first slot format is less than the number of repetitions of the uplink signal transmission, a second number of uplink slots in the second slot format is less than the number of repetitions of the uplink signal transmission, and a third number of uplink slots in the third slot format is greater than or equal to the number of repetitions of the uplink signal transmission.

Aspect 20: An apparatus for wireless communication, comprising: a memory; and at least one processor coupled to the memory and configured to: receive a resource allocation in a frequency band, the resource allocation including a plurality of portions of the frequency band, wherein each of plurality of portions of the frequency band is associated with a different slot format; and transmit a number of repetitions of an uplink signal transmission using at least a first portion and a second portion of the frequency band included in the plurality of portions of the frequency band, wherein a first portion of the number of repetitions of the uplink signal transmission is transmitted in the first portion of the frequency band and a second portion of the number of repetitions of the uplink signal transmission is transmitted in the second portion of the frequency band.

Aspect 21: The apparatus of aspect 20, wherein the second portion of the number of repetitions of the uplink signal transmission is transmitted in the second portion of the frequency band when a first current slot of the first portion of the frequency band is not an uplink slot and a second current slot of the second portion of the frequency band is the uplink slot, and wherein the first current slot is overlapping with the second current slot.

Aspect 22: The apparatus of aspects 20 or 21, wherein the at least one processor is further configured to: receive a control message identifying the at least first portion and second portion of the frequency band to be used for transmission of the number of repetitions of the uplink signal transmission.

Aspect 23: The apparatus of any of aspects 20 through 22, wherein the control message indicates a slot format for each of the at least first portion and second portion of the frequency band.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   a memory; and
   at least one processor coupled to the memory and configured to:
      receive a resource allocation in a frequency band, the resource allocation including at least one portion of the frequency band, wherein a first slot format is associated with the frequency band and a second slot format is associated with the at least one portion of the frequency band; and
      transmit a number of repetitions of an uplink signal transmission in the at least one portion of the frequency band based on the first slot format when the number of repetitions of the uplink signal transmission cannot be transmitted in the at least one portion of the frequency band based on the second slot format, wherein the number of repetitions of the uplink signal transmission cannot be transmitted in the at least one portion of the frequency band based on the second slot format when a number of uplink slots in the second slot format is less than the number of repetitions of the uplink signal transmission.

2. The apparatus of claim 1, wherein the first slot format includes a first number of uplink slots and the second slot format includes a second number of uplink slots, wherein the first number of uplink slots exceeds the second number of uplink slots.

3. The apparatus of claim 1, wherein a first number of uplink slots in the first slot format is greater than or equal to the number of repetitions of the uplink signal transmission, and a second number of uplink slots in the second slot format is less than the number of repetitions of the uplink signal transmission.

4. The apparatus of claim 1, wherein the at least one processor is further configured to:
   receive a control message identifying frequency resources of the at least one portion of the frequency band to be used for repetitions of an uplink signal transmission.

5. The apparatus of claim 1, wherein the at least one processor is further configured to:
   apply the first slot format to the at least one portion of the frequency band after the number of repetitions of the uplink signal transmission are transmitted.

6. The apparatus of claim 1, wherein the at least one processor is further configured to:
   apply the second slot format to the at least one portion of the frequency band after the number of repetitions of the uplink signal transmission are transmitted.

7. A method of wireless communication, comprising:
   receiving a resource allocation in a frequency band, the resource allocation including at least one portion of the frequency band, wherein a first slot format is associated with the frequency band and a second slot format is associated with the at least one portion of the frequency band; and transmitting a number of repetitions of an uplink signal transmission in the at least one portion of the frequency band based on the first slot format when the number of repetitions of the uplink signal transmission cannot be transmitted in the at least one portion of the frequency band based on the second slot format, wherein the number of repetitions of the uplink signal transmission cannot be transmitted in the at least one portion of the frequency band based on the second slot format when a number of uplink slots in the second slot format is less than the number of repetitions of the uplink signal transmission.

8. The method of claim 7, wherein the first slot format includes a first number of uplink slots and the second slot format includes a second number of uplink slots, wherein the first number of uplink slots exceeds the second number of uplink slots.

9. The method of claim 7, wherein a first number of uplink slots in the first slot format is greater than or equal to the number of repetitions of the uplink signal transmission, and a second number of uplink slots in the second slot format is less than the number of repetitions of the uplink signal transmission.

10. The method of claim 7, further comprising:
receiving a control message identifying frequency resources of the at least one portion of the frequency band to be used for repetitions of the uplink signal transmission.

11. The method of claim 7, further comprising:
applying the first slot format to the at least one portion of the frequency band after the number of repetitions of the uplink signal transmission are transmitted.

12. The method of claim 7, further comprising:
applying the second slot format to the at least one portion of the frequency band after the number of repetitions of the uplink signal transmission are transmitted.

13. An apparatus for wireless communication, comprising:
a memory; and
at least one processor coupled to the memory and configured to:

receive a resource allocation in a frequency band, the resource allocation including at least one portion of the frequency band, wherein a first slot format is associated with the frequency band and a second slot format is associated with the at least one portion of the frequency band; and transmit a number of repetitions of an uplink signal transmission in the at least one portion of the frequency band based on a third slot format associated with the at least one portion of the frequency band when the number of repetitions of the uplink signal transmission cannot be transmitted in the at least one portion of the frequency band based on either of the first slot format and the second slot format, wherein the number of repetitions of the uplink signal transmission cannot be transmitted in the at least one portion of the frequency band based on either of the first slot format and the second slot format when a first number of uplink slots in the first slot format is less than the number of repetitions of the uplink signal transmission and a second number of uplink slots in the second slot format is less than the number of repetitions of the uplink signal transmission.

14. The apparatus of claim 13, wherein the at least one processor is further configured to:
receive a control message identifying frequency resources of the at least one portion of the frequency band to be used for repetitions of the uplink signal transmission.

15. The apparatus of claim 13, wherein the first slot format includes a first number of uplink slots, the second slot format includes a second number of uplink slots, and the third slot format includes a third number of uplink slots, wherein the third number of uplink slots exceeds the first number of uplink slots and exceeds the second number of uplink slots.

16. The apparatus of claim 13, wherein a first number of uplink slots in the first slot format is less than the number of repetitions of the uplink signal transmission, a second number of uplink slots in the second slot format is less than the number of repetitions of the uplink signal transmission, and a third number of uplink slots in the third slot format is greater than or equal to the number of repetitions of the uplink signal transmission.

* * * * *